United States Patent
Masberg et al.

(12) 
(10) Patent No.: US 6,202,776 B1
(45) Date of Patent: *Mar. 20, 2001

(54) DRIVE SYSTEM, ESPECIALLY FOR A MOTOR VEHICLE, AND METHOD OF OPERATING SAME

(75) Inventors: Ullrich Masberg, Rösrath/Kleineichen; Thomas Pels, Overath; Klaus-Peter Zeyen, Köln; Andreas Gründl, München; Bernhard Hoffmann, Starnberg, all of (DE)

(73) Assignees: Isad Electronic Systems GmbH & Co. KG, Cologne (DE); Grundl und Hoffmann GmbH, Starnberg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/032,735

(22) Filed: Feb. 27, 1998

Related U.S. Application Data

(63) Continuation of application No. PCT/DE96/01619, filed on Aug. 31, 1996.

(30) Foreign Application Priority Data

Aug. 31, 1995 (DE) ............................................. 195 32 135

(51) Int. Cl.[7] .................................................... B60K 1/00
(52) U.S. Cl. ....................... 180/65.2; 180/65.4; 290/46
(58) Field of Search .................................... 280/165, 166, 280/167, 65.1, 65.2, 65.3, 65.4, 65.6, 65.7, 65.8; 290/46, 47, 52, 53; 318/136

(56) References Cited

U.S. PATENT DOCUMENTS

| 2,654,849 | 10/1953 | Trofimov | 310/99 |
| 2,790,917 | 4/1957 | Trofimov | 310/102 |
| 3,774,303 | 11/1973 | Burkett et al. | 30/382 |

(List continued on next page.)

FOREIGN PATENT DOCUMENTS

| 58401-73 | 1/1975 | (AU) . |
| 282 671 | 8/1912 | (DE) . |
| 874 713 | 6/1952 | (DE) . |

(List continued on next page.)

OTHER PUBLICATIONS

N. Saridakis,"Golf mit Otto–Elektro–Hybridantrieb", ATZ Atutombiltechnische Zeitschrift 87 (1985) 11, pp. 581–584.

H. Baumann, Siedekühlgefäß mit Luftrückkühlung fück Traktionsstromrichter hoher Leistung, etzArchiv, vol.11, 1989, No. 7, pp. 213–220.

E. Blessmann, "Magnetic Couplings", Machine Design, Feb. 9, 1989, pp. 105–108.

(List continued on next page.)

Primary Examiner—Richard M. Camby
(74) Attorney, Agent, or Firm—Blakely, Sokoloff, Taylor & Zafman LLP

(57) ABSTRACT

The invention concerns a drive system, especially for a motor vehicle, with a drive assembly, especially an internal combustion engine; an electric machine that is directly coupled or can be coupled to the drive shaft of the drive assembly, being designed such that it can start the drive assembly by merging in from standstill; and an automatic start-stop control of the drive assembly. The invention is also addressed to a method for operating such a drive system.

14 Claims, 7 Drawing Sheets

U.S. PATENT DOCUMENTS

| | | | |
|---|---|---|---|
| 3,870,116 | 3/1975 | Seliber | 180/54 R |
| 3,902,073 | 8/1975 | Lafuze | 290/46 |
| 3,974,396 | 8/1976 | Schönball | 290/54 |
| 4,025,860 | 5/1977 | Shibata et al. | 320/3 |
| 4,066,936 | 1/1978 | Hirota | 318/139 |
| 4,346,773 | 8/1982 | Hofbauer et al. | 180/165 |
| 4,699,097 | 10/1987 | Tanaka et al. | 123/192 |
| 4,797,602 | 1/1989 | West | 322/10 |
| 4,803,376 | 2/1989 | N'Guyen | 290/22 |
| 4,825,139 | 4/1989 | Hamelin et al. | 322/90 |
| 4,883,973 | 11/1989 | Lakey et al. | 290/31 |
| 4,942,950 | 7/1990 | Watanabe et al. | 192/0.096 |
| 4,958,095 | 9/1990 | Uchida et al. | 310/59 |
| 5,053,632 | 10/1991 | Suzuki et al. | 290/45 |
| 5,109,815 | 5/1992 | Maeda et al. | 123/192.1 |
| 5,125,236 | 6/1992 | Clancey et al. | 62/115 |
| 5,126,641 | 6/1992 | Putman et al. | 318/128 |
| 5,175,439 | 12/1992 | Harer et al. | 307/10.1 |
| 5,303,794 | 4/1994 | Hrovat et al. | 180/197 |
| 5,323,743 | 6/1994 | Kristiansson | 123/179.3 |
| 5,325,042 | 6/1994 | Murugan | 322/10 |
| 5,359,308 | 10/1994 | Sun et al. | 335/216 |
| 5,431,241 | 7/1995 | May et al. | 180/197 |

FOREIGN PATENT DOCUMENTS

| | | |
|---|---|---|
| 893 299 | 1/1953 | (DE) . |
| 904 737 | 6/1953 | (DE) . |
| 938 680 | 6/1954 | (DE) . |
| 1 077 072 | 3/1960 | (DE) . |
| 1 156 319 | 10/1963 | (DE) . |
| 1 165 422 | 3/1964 | (DE) . |
| 1 284 853 | 12/1968 | (DE) . |
| 23 45 018 A1 | 4/1974 | (DE) . |
| 23 53 724 B2 | 5/1974 | (DE) . |
| 27 04 533 A1 | 8/1978 | (DE) . |
| 28 55 886 A1 | 6/1979 | (DE) . |
| 29 02 376 C2 | 7/1979 | (DE) . |
| 28 23 225 A1 | 11/1979 | (DE) . |
| 29 17 139 A1 | 11/1980 | (DE) . |
| 29 43 563 A1 | 5/1981 | (DE) . |
| 30 09 503 A1 | 9/1981 | (DE) . |
| 30 13 424 A1 | 10/1981 | (DE) . |
| 30 48 972 C2 | 7/1982 | (DE) . |
| 30 50 269 A1 | 10/1982 | (DE) . |
| 32 30 121 A1 | 2/1984 | (DE) . |
| 32 30 607 A1 | 2/1984 | (DE) . |
| 32 43 513 A1 | 5/1984 | (DE) . |
| 33 43 018 C2 | 6/1984 | (DE) . |
| 32 43 514 C2 | 9/1984 | (DE) . |
| 33 35 923 A1 | 9/1984 | (DE) . |
| 33 38 548 A1 | 5/1985 | (DE) . |
| 35 37 994 A1 | 5/1986 | (DE) . |
| 37 37 192 A1 | 7/1988 | (DE) . |
| 38 14 484 A1 | 11/1988 | (DE) . |
| 37 43 289 A1 | 6/1989 | (DE) . |
| 37 43 317 C3 | 6/1989 | (DE) . |
| 38 12 296 A1 | 11/1989 | (DE) . |
| 39 37 082 A1 | 5/1990 | (DE) . |
| 39 26 054 A1 | 2/1991 | (DE) . |
| 40 27 664 A1 | 3/1991 | (DE) . |
| 39 39 695 C1 | 5/1991 | (DE) . |
| 40 38 301 A1 | 6/1991 | (DE) . |
| 40 00 678 A1 | 7/1991 | (DE) . |
| 41 00 937 A1 | 8/1991 | (DE) . |
| 40 11 291 A1 | 10/1991 | (DE) . |
| 41 34 268 A1 | 4/1992 | (DE) . |
| 42 13 132 A1 | 11/1992 | (DE) . |
| 41 24 496 A1 | 1/1993 | (DE) . |
| 42 02 083 A1 | 7/1993 | (DE) . |
| 42 02 737 A1 | 8/1993 | (DE) . |
| 42 30 510 C1 | 9/1993 | (DE) . |
| 42 25 683 A1 | 2/1994 | (DE) . |
| 43 30 193 A1 | 3/1994 | (DE) . |
| 43 18 949 C1 | 6/1994 | (DE) . |
| 43 39 252 A1 | 6/1994 | (DE) . |
| 43 91 898 C2 | 6/1994 | (DE) . |
| 43 44 053 A1 | 7/1994 | (DE) . |
| 43 11 697 A1 | 10/1994 | (DE) . |
| 43 14 290 A1 | 11/1994 | (DE) . |
| 43 23 601 A1 | 1/1995 | (DE) . |
| 43 23 602 A1 | 1/1995 | (DE) . |
| 44 04 791 C1 | 3/1995 | (DE) . |
| 295 02 906 U1 | 4/1995 | (DE) . |
| 44 02 152 C1 | 4/1995 | (DE) . |
| 44 37 322 A1 | 5/1995 | (DE) . |
| 44 21 512 C1 | 6/1995 | (DE) . |
| 44 08 719 C1 | 7/1995 | (DE) . |
| 44 23 577 A1 | 8/1995 | (DE) . |
| 44 12 945 A1 | 10/1995 | (DE) . |
| 44 12 438 C1 | 11/1995 | (DE) . |
| 0 151 935 A1 | 8/1985 | (EP) . |
| 0 175 952 A2 | 4/1986 | (EP) . |
| 0 233 738 A1 | 8/1987 | (EP) . |
| 0 338 485 A2 | 10/1989 | (EP) . |
| 0 354 790 A2 | 2/1990 | (EP) . |
| 0 385 311 A2 | 9/1990 | (EP) . |
| 0 427 568 A1 | 5/1991 | (EP) . |
| 0 437 266 A2 | 7/1991 | (EP) . |
| 0 440 088 A1 | 8/1991 | (EP) . |
| 0 530 659 A1 | 3/1993 | (EP) . |
| 0 557 522 A1 | 9/1993 | (EP) . |
| 0 569 347 A2 | 11/1993 | (EP) . |
| 0 604 979 A2 | 7/1994 | (EP) . |
| 0 612 928 A1 | 8/1994 | (EP) . |
| 2481656 | 11/1981 | (FR) . |
| 2563280 | 10/1985 | (FR) . |
| 20 42 772 | 9/1980 | (GB) . |
| 55-005454 | 1/1980 | (JP) . |
| 58126434 * | 7/1983 | (JP) . |
| 58-126434 | 7/1983 | (JP) . |
| 59184020 * | 10/1984 | (JP) . |
| 59-184020 | 10/1984 | (JP) . |
| 61066820 * | 8/1986 | (JP) . |
| 61-066820 | 8/1986 | (JP) . |
| 61200333 * | 9/1986 | (JP) . |
| 61-200333 | 9/1986 | (JP) . |
| 62166749 * | 7/1987 | (JP) . |
| 62-166749 | 7/1987 | (JP) . |
| 1113571 | 5/1989 | (JP) . |
| 1190922 | 8/1989 | (JP) . |
| 4024156 | 1/1992 | (JP) . |
| 05211258 | 8/1993 | (JP) . |
| 07105943 | 4/1995 | (JP) . |
| WO 88/08636 | 11/1988 | (WO) . |
| WO 91/16538 | 10/1991 | (WO) . |
| WO 94/19856 | 9/1994 | (WO) . |
| WO 95/02758 | 1/1995 | (WO) . |
| WO 95/24072 | 9/1995 | (WO) . |

OTHER PUBLICATIONS

Robert Bosch GmbH, "Kraftfahrtechniches Taschenbuch", VDI–Verlag, Düsseldorf, 21 ed. 1991, pp. 346–347; 361; 555–559 763–767.

H. Deisenroth, C. Trabert:"Vermeidung von Überspannungen bei pulsumrichterantrieben" etz, vol. 114, 1993, No. 17, pp. 1060–1067.

W. Geiβler, F. Unger–Weber: "Modelling the Three–Phase Propulsion System of a Modern Multisystem–Locomotive", EPE Firenze, (1991), pp. 4–632 –4 637.

G. and H. Häberle, "Elektrische Maschinen in Anlagen der Energietechnik", Verlag Europa–Lehrmittel, Haan–Gruiten, 3. Auflage, 1994, Seiten 169–172.

G. Hennenberger,"Elektrische Motoraustrüstung", Braunschweig, 1990, pp. 98–103.

J. Langheim, J. Fetz: "Electric Citybus with two Induction Motors–Power Electronics and Motor Control", ETEP, vol. 2, No. 6, Nov./Dec. 1992, pp. 359–365.

"Kraftfahrzeugtechnik" Nov. 1982 pp. 346–347.

Litton prospect "Bürstenloser Hohlwellen–Resolver SSBH–15", Unterföhring.

J. Reinert et al., "Digital Control and Optimization of a Rolling Rotor Switched Reluctance Maching", IEEE Transactions on Industry Appliations, vol. 31, No. 2, Mar./Apr. 1995, pp. 338–344.

F. Simovert,"Spannungszwischenkreis–Umrichter Baureihe 6SC44. . . der Fa. Siemens AG", 1985, No. A 19100–E319–A262.

D. Teodorescu, "Kleinantriebe mit Vollpolläufer–Synchronmotoren", ema, May 1993 pp. 39–43.

Manfred Weck, Studium Und Praxis, Werkzeugmaschinen Fertigungssysteme Band 3.2 Automatisierung und Steuerungstechnik 2, VDI Verlag, Apr.1995, pp. 8 pgs total.

L. Kung et al., "Hybrid III: Concepts for the Electric System of a Hybrid Passenger Car, Symp Proc 11th Int Electric Vehic Symp NA (NA) NA 1992", pp. 13 total.*

* cited by examiner

DRIVE SYSTEM, ESPECIALLY FOR A MOTOR VEHICLE, AND METHOD OF OPERATING SAME

This is a continuation of PCT/DE96/01619 filed on Aug. 31, 1996 which claims priority from German Patent Application No. 195 32 135.9 filed on Aug. 31, 1995.

BACKGROUND OF THE INVENTION

1. Field of the Invention

The invention concerns a drive system, especially for a motor vehicle.

2. Description of the Related Art

In city traffic, internal combustion engines of motor vehicles run a considerable portion of their operating time in idling, due to frequent stops at traffic lights and intersections. This represents a considerable waste of resources and a burden on the environment, since it entails a needless additional expenditure of fuel with concomitant emission of toxic, climate-active, or otherwise harmful exhaust gases.

In order to lessen these needless idling phases, passenger cars have already been implemented with a so-called automatic start-stop system. In this case, the engine is automatically stopped when a particular stop condition occurs (e.g., vehicle standstill and engine idling), for example, by interrupting the fuel supply. Upon occurrence of a particular start condition (e.g., activation of the gas pedal or engaging of a gear), the engine is then automatically started again by means of the electric starter of the vehicle. Such drive systems with automatic start-stop system are known, for example, from the following publications: EP 0 233 738 A1 (LUCAS), DE 33 43 018 C1 (MITSUBISHI), DE 44 21 512 C1 (VW).

Although known drive systems with automatic start-stop system basically work and apparently accomplish a reduction in the overall fuel consumption, they also have problems which have impeded their popularization thus far: the traditional starters used produce a relatively loud starting noise, which is mainly due to the gear noises of the pinion translation of the highly geared starter motor (the transmission ratio is generally 1:10 to 1:20). Whereas in traditional motor vehicles without automatic start-stop system the starter is only seldom activated and therefore the loud starter noise is tolerated, the automatic start-stop system with the then frequent activation of the starter leads to a noise nuisance for the passengers and residents in the vicinity of traffic lights and intersections. Furthermore, the traditional starter with its magnetic switch, pinion, single-track features, and electric motor is subject to unusually large wear and tear during the frequent activation, which a conventionally designed starter can hardly withstand; therefore, in known drive systems with automatic start-stop system, a truck starter is used—which is quite overdimensioned.

The book D. Henneberger "Electrical Engine Equipment", Braunschweig 1990, pp. 98–103, proposes a flywheel starter-generator, whose rotor is a flywheel, which sits in the drive train of a motor vehicle on the takeoff shaft between engine and transmission and which can be decoupled from these by means of couplings. For starting, the decoupled—and therefore idling—flywheel is first accelerated as an electric motor. The actual starting process then occurs at a sufficient rotary speed for the starting (e.g., 1000 rpm) by fast closing of the coupling with the engine. In this way, the flywheel is braked and the engine's crankshaft is accelerated until both reach a common mean rotary speed (e.g., 500 rpm) and self-starting of the engine occurs.

Features of this flywheel-starter-generator are, first, limitation of the energy available for starting and the relatively long dead time (namely, the acceleration of the flywheel from standstill to sufficient speed for the starting takes around 3 s), which hinders a starting under nonideal conditions and several consecutive starting attempts, and secondly the clutch noise caused by the coupling to the engine at high relative speeds and the also concomitant friction losses, which detract from the efficiency and—in the case of several consecutive starting events—can also result in a heat overload of the coupling. Although the book mentions the possibility of a start/stop function, the proposed flywheel-starter-generator seems little suited for this, on account of the above-mentioned properties. A similar flywheel starter with start/stop function is known from DE 37 43 289 A1 (LuK).

The following publications are cited as further state of the art: EP 0 151 935 A1, DE 30 48 972 C2, DE 39 26 054 A1, U.S. Pat. No. 6,323,743, DE 44 12 438 C1, DE 43 44 053, DE 43 18 949 C1, DE 33 38 548 A1, DE 33 35 923 A1, DE 32 30 121 A1, DE 43 11 697 A1, DE 37 43 289 A1, DE 42 02 082 A1, DE 40 00 678 A1, U.S. Pat. No. 4,346,773, DE 33 38 548 A1, DE 44 37 322 A1, DE 28 55 886 A1, DE 42 25 683 A1, DE 32 43 513 A1, DE 38 14 484 A1, DE 44 08 719 C1, DE 23 724 B2, DE 44 04 791 C1, journal "Kraftfahrzeugtechnik", 11/82, p. 346–347.

SUMMARY OF THE INVENTION

A drive system comprising a drive assembly, especially an internal combustion engine (1); an electric machine (4) that is directly coupled or can be coupled to the drive shaft (10) of the drive assembly, being designed such that it can start the drive assembly by merging in from standstill; and an automatic start-stop control of the drive assembly.

BRIEF DESCRIPTION OF THE DRAWINGS

The invention shall now be explained more closely by means of sample embodiments and the enclosed schematic drawing. The drawing shows.

DETAILED DESCRIPTION OF THE EMBODIMENTS

Figure 1:
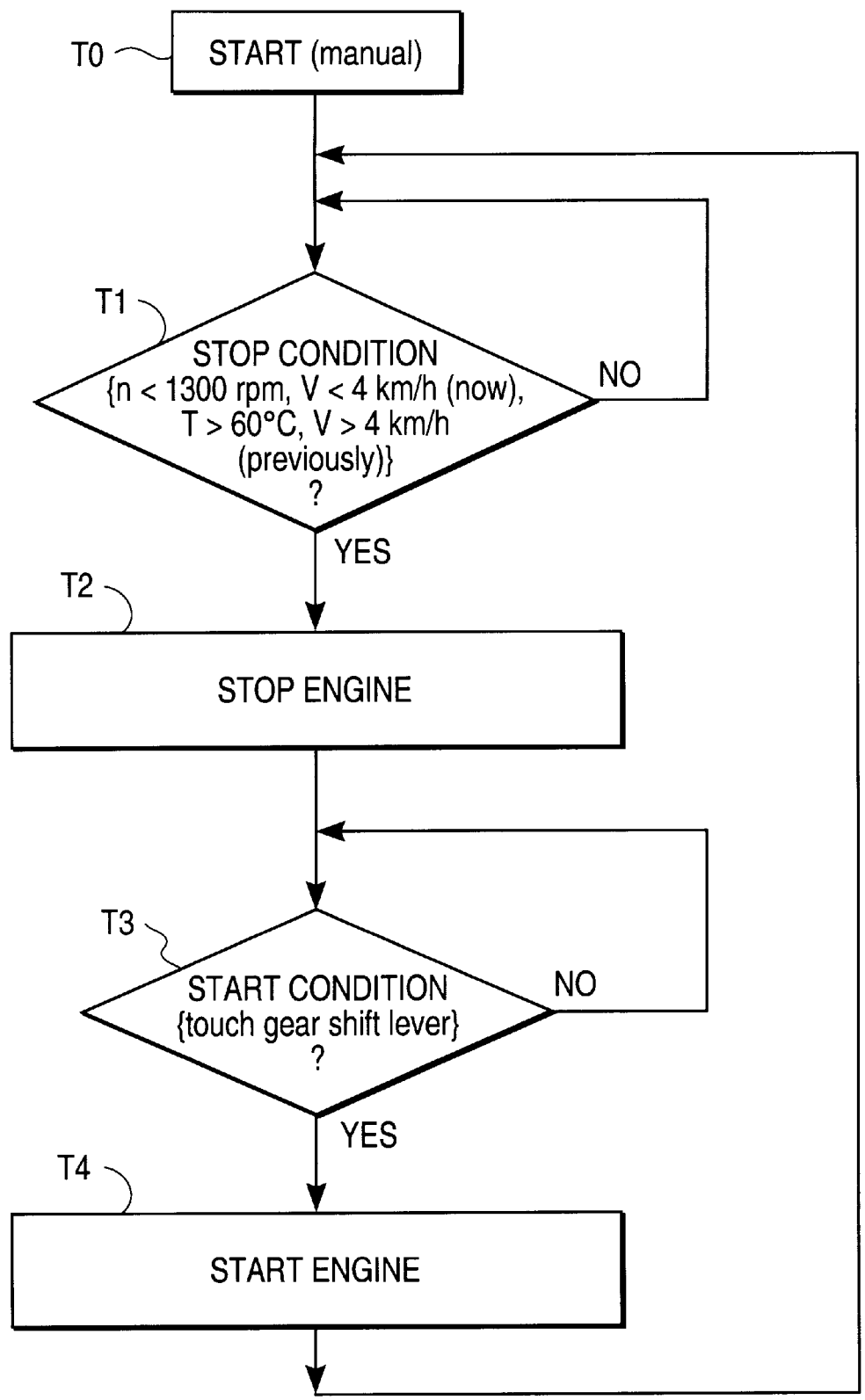
FIG. 1 a schematic representation of a control sequence for a start-stop automation.

The invention aims to further develop drive systems with automatic start-stop system.

It accomplishes this goal with a drive system, especially for a motor vehicle, with
- a drive assembly, especially an internal combustion engine;
- an electric machine that is directly coupled or can be coupled to the drive shaft of the drive assembly, being designed such that it can start the drive assembly by merging in from standstill; and
- an automatic start-stop control of the drive assembly (claim 1).

An "electric machine" is any kind of machine for rotational movement, which can be operated as an electric motor (and possibly as an electric brake and/or a generator).

By "direct coupling" is meant, in particular, a gearless coupling of the rotor of the rotor (or the possibly rotary stator) of the electric machine with the drive shaft. Thus, the torque transmission is not produced indirectly through gears or tension means (e.g., V-belts). The rotary speed of the rotor (or the possibly rotary stator) is preferably equal to the rotary speed of the drive shaft and, thus, generally that of the drive assembly.

When "merging in," the ratio of the momentary rotary speeds of the electric motor and the drive assembly—unlike the case of a flywheel starter—remains essentially constant (and in particular, its value is unity). Merging in "from standstill" means that the electric machine and the drive assembly—unlike the case of the aforesaid flywheel starter—run up together from standstill. Hereafter, a "starting by merging in from standstill" shall also be termed a "direct starting".

The drive system according to the invention has the following benefits:
- because of the direct coupling or coupleability of the electric machine to the drive shaft of the drive assembly, the starter produces almost no audible noise;
- because of the merging in from standstill, the starting is fast with only slight dead time;
- because of the direct coupling and the merging in, the starter is practically free of wear and tear;
- and achieves a relatively very high efficiency;
- the starter has a relatively low weight as compared to a flywheel starter, and the absence of the coupling system for the flywheel is also beneficial;
- on the whole, the drive system by virtue of these beneficial properties can lead to a greater popularity of the automatic start-stop system and thus make an important contribution to environmental protection by reducing the consumption of raw materials and the emission of exhaust gases.

Advantageously, the rotor (or the rotary stator) of the electric machine sits the drive shaft (generally the crankshaft) of the internal combustion engine or an extension (generally decoupleable from it) (claim 2). That is, the rotor (or the rotary stator) and the drive shaft or its extension are coaxially arranged. They are preferably permanently and firmly joined together; but a detachable firm connection is also possible, which allows or precludes a relative rotation as desired.

The automatic start-stop control preferably initiates an automatic stopping of the drive assembly when a stop condition (or one of several) is fulfilled. Various individual conditions can be used to define a stop condition, e.g.: no load, shift operation, idling of the drive assembly (i.e., rotary speed below a particular low value), standstill of the vehicle (i.e., driving speed below a particular small value, e.g., 4 km/h), drive assembly disengaged, no gear engaged, main brake or parking brake is activated, activation of a stop switch (claim 3). These individual conditions can define the stop condition alone (e.g., stop condition=standstill of the vehicle) or in any combination (e.g., stop condition=idling of the drive assembly and standstill of the vehicle) and/or in combination with other operating conditions, e.g., the operating temperature of the drive assembly is attained and/or the battery charge is sufficient for additional activations of the starter. Stopping of the drive assembly can occur either at once when the stop condition occurs (i.e., with very short response time) or at a delay (e.g., with a response time of a few seconds). The stop condition can also include quantities which concern the prior driving history, e.g., it may be required that the vehicle has been driven at least once since the last stopping of the drive assembly. It is also possible to determine from the preceding driving characteristics whether the vehicle is, say, in city traffic, stop-and-go traffic of a traffic jam, or in cross-country traffic; the quantity "city traffic" can be required as a further individual condition for the stop condition. The response time can be adaptively variable, in dependence on individual or operating conditions or the prior driving history, e.g., it can be automatically shortened when a lot of traffic light stops have occurred in the recent past, and lengthened in the opposite case.

Accordingly, the start-stop control initiates an automatic starting of the drive assembly by means of the electric machine preferably when a starting condition (or one of several) is present. Again, various individual conditions—alone or in combination—serve to define the start condition, e.g.: activation of the gas pedal, release of the main brake or parking brake, activation of the clutch, touching or moving a gear shift lever, engagement of a gear, activation of a start switch (claim 4). The fulfillment of yet other conditions may be required for the start condition, e.g., that the engine is halted and/or has been previously shut off by automatic stop. An "emergency start" can be triggered when, e.g., the temperature of the drive assembly falls below the operating temperature and the battery charge falls below a limit value. In order to preclude an unintentional starting of the vehicle, however, it may be necessary to fulfill a corresponding condition—such as "no gear engaged".

Traditional starters, on account of their high translation ratio, only bring the internal combustion engine up to a relatively low starting speed (typically 80–250 rpm), which is far below its idling speed (typically 600–800 rpm). The same applies to familiar flywheel starters, if one wants to keep the dead time and clutch wear in acceptable bounds. The difference between starting speed and idling speed must then be overcome by the engine under its own power. For this, however—since at these speeds it is far below its idling speed in a very unfavorable operating range—it requires a relatively large amount of fuel, which moreover is only incompletely burned. Therefore, each starting of the engine involves additional fuel consumption and especially polluting emissions. This, on the whole, forfeits some of the ecologically beneficial effects of an automated start-stop system. Preferably, therefore, the drive system is configured such that the electric machine is in driving mode, at least essentially until reaching the idling speed of the internal combustion engine (which usually lies between 600 and 800 rpm at operating temperature) (claim 5). This provision allows the engine to start only when attaining its idling speed and thus eliminates the unfavorable running up under its own power. In this way, it reduces the fuel consumption and the particularly harmful emissions during starting and also makes the starting process quicker. The measure is thus especially ecologically advantageous and is especially suitable for contributing to an even greater popularization of drive systems with start-stop automation.

Automatic start-stop controls have also been proposed in which the engine is decoupled and stopped in pushing operation as well (e.g., going downhill). But in this case, the engine's brake action is suddenly lost. Therefore, the electric machine preferably works like an electric vehicle brake in the case of a stopping of the drive assembly during pushing operation, replacing the lost braking torque of the drive assembly (claim 6). For this, it is advantageous to arrange a controlled-activated coupling between the drive assembly and the electric machine.

Advantageously, the electric machine is a rotary-field or traveling-wave machine (claim 7). By "rotary-field machine"—in contrast with a commutator machine—is meant a machine in which a rotary magnetic field occurs. This can be, for example, an induction or synchronous machine, especially for three-phase current, or a machine with electronic commutation. In a rotary-field machine, the magnetic field sweeps through a complete 360° revolution, while in a traveling-wave machine it only sweeps through one or more segments (sectors). Thus, for example, the traveling-wave machine can be an induction or synchronous machine whose stators extend only across one or more sectors of the rotor—resembling one or more curved linear motors.

Preferably, the drive system has at least one inverter for generating the voltages and/or currents of variable frequency, amplitude and/or phase required for the magnetic fields of the electric machine (claim 8). The inverter can generate the voltages and/or currents needed for the magnetic fields (in particular, rotary or traveling fields) with any desired (within certain limits) frequency, amplitude or phase, or any desired combination of these quantities. It can do this advantageously by means of electronic switches from a predetermined dc or alternating voltage or a predetermined direct or alternating current (so-called pulse inverter). To special advantage, all three quantities—frequency, amplitude and phase—are freely selectable. An inverter generally has the advantage of being able to operate the electric machine with high variability under the most diverse operating conditions, possibly also—as shall be explained more closely hereafter—in a mode with rapidly alternating torque, possibly with superimposed constant torque.

Preferably, the electric machine, besides its starter function, also has the function of an active reduction of rotational nonuniformities during the operation of the drive assembly (claim 9). Proposals for devices for reduction of rotational nonuniformities of an internal combustion engine are disclosed by, e.g., Patent Abstracts of Japan, Volume 11, No. 28 (M-557), Jan. 27, 1987 & JP-A-61 200 333 (NISSAN I), Patent Abstract of Japan, Volume 4, No. 29 (M-002), Mar. 14, 1980 & JP-A-55 005 454 (TOYOTA), EP-B-0 427 568 (ISUZU), DE-A-32 30 607 (VW), EP-B-0 175 952 (MAZDA), Patent Abstracts of Japan, Volume 7, No. 240 (M-251), Oct. 25, 1983 and JP-A-58 126 434 (NISSAN II), DE-A-41 00 937 (FICHTEL & SACHS), DE-A40 38 301 (HITACHI/NISSAN), EP-A-0 440 088 (NISSAN III) and EP-A-0 604 979 (NIPPONDENSO).

In particular, rotational nonuniformity can be such as occurs in an internal combustion engine, particularly a piston engine with internal combustion, through the gas and mass forces of the individual pistons acting on the drive shaft (i.e., especially the crankshaft). For example, in a four-cylinder four-stroke engine, relatively large rotational nonuniformity occurs in the second order (i.e., twice the rotational frequency of the engine). Furthermore, there is rotational nonuniformity at higher orders, as well as stochastically occurring nonuniformities. The internal combustion engine can be, e.g., a two-stroke or a four-stroke engine with an even number of cylinders (e.g., 2, 4, 8, 10, 12 cylinders, etc.) or an odd number of cylinders (1, 3, 5, 7, 9, 11, etc., cylinders) (which may operate by the Otto or the Diesel principle). In theory, it can also be a different kind of internal combustion engine, such as a piston engine with external combustion (so-called Stirling engine). Another possibility is a rotary engine (e.g., a Wankel engine), in which at least the gas forces can produce rotational nonuniformity. Moreover, turbines can be considered, especially gas or steam turbines. Although generally the rotational nonuniformities in them are only slight; for certain applications, however, they may also require especially good true running.

But the rotational nonuniformities need not come (exclusively) from the drive assembly (e.g., that of a motor vehicle, rail vehicle, or ship). Rather, the rotational nonuniformity may also arise in a power train - i.e., between the drive assembly and the takeoff point, through universal joints, three-dimensional shaft vibrations, or gear wear, for example.

Basically, the electric machine can be controlled such that it either counteracts only rotational nonuniformities toward speeding up (so-called positive rotational nonuniformities) or those toward slowing down (so-called negative rotational nonuniformities). However, especially effective is a method in which it counteracts both negative and positive rotational nonuniformities, i.e., preferably by generating a rapidly alternating torque, namely, a braking torque for a positive rotational nonuniformity and a driving torque for a negative rotational nonuniformity. The electric machine can generate a positive or negative torque that varies only slowly relative to it or is constant (so-called constant torque) for additional functions to achieve a driving action or a braking or generator-type action. Constant torque and rapidly alternating variable torque can be superimposed on each other (claim 10). In configurations in which the electric machine also acts as an electromagnetic coupling, a rapidly varying coupling slip of larger or smaller magnitude can take the place of the rapidly alternating braking and driving torque.

By "rapid variation" is meant a variation in the frequency range of the rotational nonuniformity being reduced, i.e., for the second-order rotational nonuniformity at a rotary speed of 3000 rpm a variation with a frequency of 100 Hz. On the contrary, the possibly superimposed constant torque generally varies slowly or is even constant—apart from possibly steep edges at the beginning or end of the superpositioning.

Thanks to the (especially additive) superpositioning of the constant torque in the desired direction and strength, the reduction of the rotational nonuniformity and the generation of the constant torque are decoupled from each other. The rapidly varying torque is practically unchanged in its duration by the superpositioning, being only shifted relative to the zero line. As an exception, the rapidly varying torque changes only if the internal combustion engine actually shows an altered rotational nonuniformity on account of the change in load accompanying the switching in of the constant torque.

If the constant torque being furnished at the moment is smaller than the amplitude of the alternating torque at that time, the combined torque of the electric machine shows alternately positive and negative values—albeit shifted with respect to the zero line. If, on the other hand, it is larger than such, the combined torque is only positive or negative, and its magnitude contains a rapidly varying component. A constant braking torque can serve to make the electric machine diminish the coupling slip, perform a braking synchronizer function, act as a generator for current supply and/or produce or sustain a braking of the vehicle and/or reduce the slip of a drive wheel by braking, perhaps as part of an antislip control. The braking energy (constant torque brake energy) obtained when using these brake functions as a generator can be saved up—like that resulting from rotational nonuniformity—(for example, in an electrical accumulator or in a flywheel accumulator) and later used as drive energy or be furnished to a power grid or, for example, the vehicle's battery. A constant drive torque can serve an accelerating synchronizer function or sustain (when the electric machine functions as a "booster") or produce an acceleration of the vehicle, for example, to cover acceleration gaps, as in the case of a turbocharged engine.

In order to achieve the highest possible overall efficiency of the drive system, the energy obtained when reducing a positive rotational nonuniformity (rotational nonuniformity brake energy) and/or the energy obtained from the constant braking torque (constant torque brake energy) is at least partially saved up and the saved rotational nonuniformity brake energy is at least partially used later on, perhaps to reduce a negative rotational nonuniformity.

The saving of the alternating torque brake energy and/or the constant torque brake energy can be done in particular by an electrical accumulator and/or a mechanical accumulator (flywheel accumulator): the electrical accumulator can be, for example, a capacitance, an inductance and/or a (fast-acting) battery. The inverter, if present, is advantageously an intermediate-circuit inverter, whose intermediate circuit has at least one electrical accumulator for brake energy or is coupled to at least one such accumulator. It can either serve exclusively for the accumulation of brake energy (in this case, it will be switched in generally in addition to a normally present intermediate-circuit accumulator, which can furnish the necessary voltage or current pulses during the inverter's operating cycle), or it can serve only partially for the accumulation of the brake energy, i.e., save up yet other energy—which may be needed for the operating cycle (in the latter case, it could coincide with the usual intermediate-circuit accumulator). Moreover, it may be advantageous in any case to design the rectifier as an intermediate-circuit rectifier—for example, even without intermediate accumulation of brake energy.

By an "intermediate circuit" is meant a circuit which can supply essentially dc voltage or direct current, from which an inverter component (the so-called machine inverter) can form variable alternating voltage or current by pulse or cycle operation. This dc voltage or direct current must provide voltage or current pulses with extreme edge steepness and at high voltage or current level. Generally speaking, an intermediate-circuit inverter comprises three subassemblies, namely, an input subassembly for supplying or taking away electrical energy, an output subassembly in the form of the machine inverter, and the intermediate circuit which comes between these.

In a flywheel accumulator, the flywheel can preferably be electrically coupled to the system by a (second) electric machine. This can be, for example, a rotary-field or commutator machine controlled by its own rectifier. The first electric machine and the flywheel machine work in opposite cycle: when the former is braking, the latter is accelerating the flywheel, and when the former is driving or not braking so much, the latter is braking the flywheel. Relatively high energy densities can be built up with such a flywheel energy accumulator.

As mentioned above in connection with the constant torque, the (first) electric machine can also perform other functions at the same time or staggered in time—besides the possible rotational nonuniformity reduction—and thus replace machines which are traditionally specialized in these functions. In particular, it can also have the function of a generator for electricity supply, e.g., to charge a battery or energize a power grid (claim 12). In this configuration, the electric machine constitutes a starter/generator, which can replace the two separate corresponding machines which are traditionally present. During the starting process, it is generally not necessary to reduce rotational nonuniformity; for this, the electric machine will be operated temporarily as a pure electric motor. On the other hand, the generator function can also be desirable when reducing rotational nonuniformity. Averaged out over time, a gain in electric energy is achieved by (additively) superimposing the rapidly varying torque with a simultaneously braking torque.

In corresponding manner, the electric machine can also produce or sustain acceleration and/or braking of the shaft as an additional function (claim 13). For example, this can serve to accelerate a motor vehicle, along with the drive assembly. For braking a vehicle, the electric machine can serve as a wear-free, possibly generator-type brake or extra brake. In combination with a drive slip control, the electric machine can quickly reduce the drive torque and, thus, the slip of one or more drive wheels by braking. In electromagnetic coupling function, the drive wheel slip can be reduced by increasing the coupling slip, instead of by braking.

The brake energy obtained when employing these additional functions can be saved—as mentioned above—and later used as drive energy or be supplied to a network or, for example, the car battery. In order to achieve the highest possible efficiency of brake energy recycling when braking the vehicle by means of the electric machine, it is advantageous to separate the electric machine from the engine by means of an intervening, e.g., mechanical coupling during braking.

To supply high-power consumers, such as auxiliary machines (air conditioners, servo-drives, pumps) and heating systems, it is preferable that the electric machine furnish current at relatively high voltage level, preferably in the upper part of the low voltage region, where no special electrocution protection measures are necessary (e.g., around 60 V dc voltage). If one goes beyond this, a range of 250–450 Volts is preferably selected. Advantageously, the high-power consumers are electrically operated (or heated) at these high voltage levels (instead of being mechanically operated, as heretofore, or operated with waste heat) (claim 14). Such a high voltage level can already exist, in particular, in the intermediate circuit of an intermediate-circuit inverter, and thus need not be specially generated for this additional purpose. For low-power consumers, a traditional low-voltage network (12 V or 24 V) can be provided.

The active reduction of rotational nonuniformity—as mentioned—is based on the fact that the electric machine can counteract positive and negative rotational nonuniformity, and thus acts as a brake for positive and as a drive for negative rotational nonuniformity. For this, the control device requires information about the time and possibly the magnitude of a positive or negative rotational nonuniformity.

One possibility of obtaining this information lies in a measuring of the momentary rotational nonuniformity or another quantity connected to it. If the operation of the electric machine is based on this information, we have an automatic (feedback) control, since the actual presence of a rotational nonuniformity leads to an immediate action on this rotational nonuniformity.

Another possibility is to use not the actual, but rather an expected rotational nonuniformity as information for operating the electric machine. Thus, we have here a (nonfeedback) control. For example, in an internal combustion engine, one can determine the magnitude and direction of the momentary rotational nonuniformity as a function of the (crank) shaft angle and one or more additional operating parameters (such as rotary speed and throttle valve position) by using a prototype or simulation on a computer and outfit each mass produced engine with this information saved in the form of a characteristic diagram. During operation, the system then measures the momentary crankshaft angle present and the other operating parameters (such as rotary speed and throttle valve position), reads the corresponding memorized diagram values for magnitude and amplitude of the anticipated rotational nonuniformity, and controls the electric machine through the control device in order to counteract the rotational nonuniformity. Furthermore, an adaptive control is possible, i.e., a (nonfeedback) control in which the control information is not fixed, but rather defined or at least modified by measuring earlier rotational nonuniformities.

Moreover, mixed forms of the mentioned kinds are possible, e.g., the expectation values memorized in a characteristic diagram may be adaptive with respect to an anticipated quantity (such as the amplitude), while they can be fixed with respect to another expected quantity (say, shaft angle). Also, a very advantageous combination is an automatic control with servocontrol, in which the automatic control in each control interval is first adjusted to an expected rotational nonuniformity value from a characteristic diagram (servocontrol) and then works off the generally slight deviations between the actual value and the preset value (automatic control). This type of control provides a very fast and exact regulation with relatively low expense. It may also be advantageous to work with automatic (feedback) control at low speeds (e.g., idling), and to switch to open-loop (nonfeedback) control at higher speeds.

In automatic control, adaptive open-loop control, and corresponding mixed forms, the metered quantity need not immediately be the rotational nonuniformity (possibly derived from a measurement of the angle position or angular velocity as a function of time). Instead, it can also be one (or more) other quantities which allow a conclusion as to at least some of the rotational nonuniformities occurring. In an internal combustion engine, this quantity can advantageously be the gas pressure in one or more engine cylinders. For the gas pressure is a major variable source of rotational nonuniformities. Furthermore, another important, practically unchangeable source should be taken into account—the mass forces. Their magnitude can be permanently saved in a characteristic diagram. As an alternative (or supplement), the momentary torque of the engine can be measured, e.g., by means of a torque hub. Thus, using the gas pressure and/or the momentary torque as a metered quantity enables a relatively simple and fast automatic control, adaptive open-loop control, or corresponding mixed form. The gas pressure and/or the momentary torque can also represent a useful quantity for the engine control.

The electric rotary-field machine or traveling-wave machine of the drive system is preferably an induction machine, a synchronous machine, or a reluctance machine, especially for three-phase current. An induction machine generally has a relatively simple rotor (generally a rotor with short-circuit windings or windings whose ends go to slip rings). On the other hand, synchronous machines have rotors with distinct poles, which are energized by permanent magnets or electromagnets, which are energized, e.g., by slip rings. Reluctance machines belong to the synchronous machines in the broad sense. In particular, the control of the electric machine in the case of the induction machine is preferably based on a field-oriented automatic control (so-called vector control). Starting with directly measurable momentary quantities, such as the imposed voltage, stator current, and perhaps rotary speed, using a computerized dynamic machine model, the stator current is broken down into a torque-forming component, which generates the torque with the rotor flux, and a component perpendicular to this, generating the machine flux, thus determining the torque.

The electric machine plus associated control unit is generally an auxiliary system, which is arranged, for example, in the drive train of a motor vehicle with the drive assembly. Because of its auxiliary nature, it should take up little space relative to the drive assembly, and therefore should be as compact as possible. On the other hand, the electric machine must be applied to produce very large torques for the direct starting. The advantageous measures mentioned hereafter serve such a compact construction—besides other advantageous purposes.

One step for achieving good compactness is for the electric machine to have a fine pole division, in particular, at least one pole per 45° angle of the stator. In a full-circle (360°) machine, this corresponds to a total of at least 8 poles. Even smaller polar divisions are especially advantageous, corresponding to 10, 12, 14, 16 or more poles in the closed-circle machine. A fine polar division allows the stator winding heads to be small, both in the axial and the peripheral direction of the machine, so that the machine can be shorter overall in the axial direction. Also, with a finer pole division, the stator back for the return magnetic flux can be thinner (and, thus, also lighter), with the result that the rotor can have a larger diameter for the same outer diameter of the machine. A larger rotor diameter leads to a larger torque, on account of the longer air gap in the peripheral direction and the larger active lever arm. Thus, on the whole, a finer pole division leads to a lighter and more compact machine. In addition, the resistive losses are less on account of the shorter length of the winding wires—smaller winding heads require less nonactive winding wire. Since, moreover, the stray field (which essentially determines the reactive power component) depends on the winding head surface, it is relatively slight for a fine pole division. A slight stray field is especially advantageous for reducing the rotational nonuniformity, because in this case—unlike a conventional electric machine—there is an ongoing alternation between engine and generator operation and reactive power must be continuously consumed with the corresponding pole reversal.

Fine pole divisions are not customary for high-speed rotary-field machines, since they result in a relatively high frequency of pole reversals. A customary value for the pole reversal frequency is 120 Hz, for example. The electric machine used in the context of the invention, on the other hand, preferably has a high maximum pole reversal frequency, preferably between 300 and 1600 Hz or more, especially preferably between 400 Hz and 1500 Hz.

In order to lessen the influence of eddy currents in the stator—which increase with higher pole reversal frequency—the stator preferably has thin stator plates, preferably with a thickness of 0.35 mm or less, especially preferably 0.25 mm or less. As a further measure for diminishing the losses, the stator plates are preferably made from a material with low remagnetization losses, especially less than 1 W/kg at 50 Hz and 1 Tesla.

As a further measure contributing to a compact construction, the electric machine preferably has an inner fluid cooling. The fluid can be preferably oil. A very effective cooling technique consists in placing the machine entirely under oil in the interior. However, a disadvantage of this is that turbulence losses occur above around 500 rpm, and these can take on noticeable extent above roughly 2000 rpm. In order to counteract this, the supply of cooling fluid is preferably dependent on the loss power and/or rotary speed, and the fluid cooling is preferably a spray fluid cooling. There is then always only as much cooling fluid in the machine as is required at the time to carry away the loss power.

Quantitatively, the compactness can be expressed in terms of the "torque density." Preferably, the electric machine has a high torque density—as compared to the maximum torque—which is especially preferably greater than 0.01 $Nm/cm^3$.

Radial vibrations can also often occur on a shaft with rotational nonuniformities, especially the crankshaft. In order to be robust to radial vibrations, the system is preferably designed such that the electric machine works far into the region of magnetic saturation. A measurement of the magnetic saturation is the current coverage (at maximum torque) in the stator per centimeter length of the air gap in the peripheral direction. Preferably, this measure amounts to at least 400–1000 A/cm, especially preferably at least 500 A/cm. Operation far into the saturation range makes it possible to design the machine with relatively broad air gap. Changes in the air gap—such as occur during radial vibrations—have little effect, due to the operation in the saturation range.

Such a compact-construction electric machine generally has relatively low inductance. Yet in order to achieve, for example by means of a synchronized voltage, the most precise sinusoidal current to generate the electrical rotary fields or traveling waves, the inverter preferably works at least sometimes with a high clock frequency, in particular, 10 kHz to 100 kHz or more. This provision is also advantageous for achieving a high temporal resolution for the system: for example, with a cycle frequency of 20 kHz, one can achieve a temporal resolution in the torque behavior of the electric machine of 2 kHz, with which one can effectively reduce a rotational nonuniformity at 200 Hz (200 Hz corresponds, for example, to the fourth order at 3000 rpm). A high clock frequency also contributes to a compact construction for the inverter itself, since it allows smaller intermediate circuit capacitors, which can be placed directly next to the electronic switches with short conductor pathways. Moreover, EMC (EMC: electromagnetic compatibility) filters of the inverter can be smaller.

As a further advantageous provision for achieving a compact construction of the inverter, electronic switches of the inverter are fluid-cooled, preferably boiling bath cooled. As the boiling bath coolant, one can use a fluorohydrocarbon, for example. In boiling bath cooling, the coolant evaporates at hot spots and in this way obtains its relatively high heat of evaporation from them. The vapor rises and can condense, for example, in an external cooler, thereby surrendering its heat of evaporation. This cooling technique enables the most compact arrangement of the electronic switches of the inverter without any cooling body. Furthermore, it has the advantage that relatively slight temperature differences are enough to achieve even high cooling performance, namely, a difference of 2–10° C., compared to around 40° for air cooling. Another advantageous cooling technique consists in connecting several electronic switches of the inverter, especially 2–20 or more, in parallel. The parallel circuit yields a distributed arrangement of heat sources and, thus, a relatively low loss power density.

The inverter preferably contains semiconductor elements as switches, preferably fast semiconductor switches, such as field effect transistors—especially preferably metal oxide semiconductor (MOS) field effect transistors, bipolar transistors, and/or bipolar transistors with insulated gate connection (IGBTs). By "fast" semiconductor switches are meant, in particular, ones which allow maximum clock frequencies of 10–100 kHz or more.

The inverter generates the voltages and/or currents necessary for the magnetic fields of the electric machine, preferably through pulses, especially on the basis of pulse width or pulse amplitude modulation. With constant intermediate circuit voltage, nearly sinusoidal currents of arbitrarily adjustable frequency, amplitude, and/or phase can be generated by sine-evaluated pulse width modulation at high clock frequencies, thanks to the machine inductance. In pulse amplitude modulation, one starts, for example, with an inverter with variable intermediate-circuit voltage and thus generates pulses of different amplitude.

In order to identify the instantaneous angular position of the shaft at any time in the system, the electric machine or the shaft is advantageously outfitted with a rotor position or shaft position pickup. From the information on the instantaneous angle position, a conclusion can be drawn as to the instantaneous angular velocity and acceleration and, thus, the instantaneous rotational nonuniformities. In an automatic control system, the reduction of the rotational non-uniformity can be based on this information—as explained above. In an open-loop control system, the information on the instantaneous angle position and possibly the instantaneous mean rotary speed is used to read out the correct expectation value from the characteristic diagram. To obtain the most precise angle position information possible, a rotation transformer (so-called "resolver") can be used in particular, i.e., a transformer with translation ratio dependent on angle. High-resolution encoders can also be used for this purpose, e.g., a combination of a high-resolution incremental pickup and a simple absolute pickup.

Traditionally, one uses friction-closure couplings in drive systems of motor vehicles, which enable a starting of the vehicle with torque transformation ("grinding clutch") in the starting phase. A further task consists in allowing a gear shifting by separating the drive assembly from a shift transmission and subsequent reconnection with an adjustment of the rotary speed of drive assembly and transmission provided by friction. Moreover, hydrodynamic clutches are known, some of them with a transformer function.

Instead of or in addition to such couplings, one can advantageously configure the electric machine such that it acts as an electromagnetic coupling in the drive train and/or as active transmission synchronization device or as a part thereof. In an "electromagnetic coupling," the transmission of torque occurs through the coupling by electrical, magnetic, or electromagnetic forces. It is possible for this type of force transmission to occur only temporarily, for example, after achieving the same rotary speed for the shafts being coupled the force transmission can be taken over by a mechanical coupling.

In one advantageous embodiment, the drive system comprises two electric machines for the function of the electromagnetic coupling and/or the transmission synchronization device, i.e., a dual electric machine. In the normal operation—when the drive momentum produces torque via the drive train—the first electric machine functions as a generator and the second as a motor, while the electric energy needed to operate the motor is essentially derived from the generator. Thus, in this configuration, the mechanical rotational energy furnished by the drive is first transformed into electric current by a pair of relatively rotating electromagnetic active surfaces (stator and rotor of the first electric machine) and then changed back by a second pair of relatively rotating electromagnetic active surfaces (stator and rotor of the second electric machine) into mechanical rotational energy, possibly at different rotary speed and with different torque. The quantum of energy put out by the first machine can be larger or smaller than that taken up by the second machine. The excess or deficit can be saved in an energy accumulator or withdrawn from such, respectively. The two machines can be mechanically coupleable through a bridge coupling. Starting of the drive assembly occurs through motor operation of the electric machine.

In the other advantageous configuration, the coupling is formed by a single electric machine, which has at least two rotary electromagnetic active units (e.g., rotor and rotary-mounted stator), one of which is coupled or can be coupled to a torque transmitter at the drive end, e.g., the drive shaft coming from the drive assembly, and the other to a torque transmitter at the takeoff end (e.g., the takeoff shaft going to the transmission). The machine corresponds, e.g., to a normal machine with rotor and stator, which can rotate as a whole in addition to the rotor's rotation. The rotating machine can generate positive and negative relative torques between rotor and "stator." In this way, the clutch slip can be caused to vanish and, thus, the function of a traditional clutch be simulated.

The function of direct starting, as well as a number of additional functions of the electric machine, can be achieved with stator (or also rotor) restrained from turning—since a fixed support is necessary for them. The restraining can be mechanical, say, through a friction-closing or positive-closing connection of the active unit with a nonrotating part (e.g., engine or transmission housing or vehicle chassis), or electrical, in that said active unit is present twice, namely, once permanently rotary and once permanently restrained from rotation, and a switching from the rotary to the nonrotating is accomplished electrically. As a result, the latter corresponds to the mechanical restraining.

The electric machine can also serve for drive slip regulation (ASR). Regulation of the drive slip—in the state of the art—is accomplished in that, when a limit value of drive slip or a time change (time derivative) of the drive slip is attained, the driving moment is reduced. Reduction of the driving moment is implemented either by adjustment of the engine, i.e., by throttle valve adjustment or by ignition time adjustment, or by activating one or more wheel brake(s). A combination of both measures is also known. In particular, in addition to the engine adjustment, which occurs when a first limit value of the drive slip is exceeded, the wheel brakes can be activated when a second, higher limit value of drive slip is attained. Such regulating systems, on the one hand, are relatively sluggish, and on the other relatively hard to control, i.e., a particular time course of the drive torque reduction can almost never be achieved.

According to an advantageous configuration, the electric machine serves to regulate drive slip and is designed such that it can produce a drive slip reduction by reducing the driving torque (of the drive assembly), in particular, by brake action and/or—when the electric machine is working as a coupling—by coupling slip action.

The invention is also addressed to a method of operating a drive system, especially for a motor vehicle, wherein the drive system comprises a drive assembly, especially an internal combustion engine, and an electric machine directly coupled to or which can be coupled to it, with at least one electric machine, which is coupled or can be coupled to the drive shaft of the drive assembly, wherein the drive assembly is automatically stopped and started by a start-stop control, wherein the electric machine starts the drive assembly by merging in from standstill.

The method can advantageously be carried out with a drive system according to one or more of the above-explained configurations. As regards individual features and advantages of the method, we refer to the above explanations on the system, which also pertain entirely to the method in its various configurations.

The subjects of the specification can also be advantageous in a drive system and a corresponding method without automatic start-stop control and sometimes also without starter function of the electric machine. Therefore, we reserve the right to orient patent claims to these subjects, omitting the features pertaining to the start-stop control and possibly also the starter function.

Furthermore, in all of the present specification, numerical indications "x" shall be understood in the sense of "at least x," and only preferably in the sense of "exactly x."

In the figures, parts essentially identical in function bear the same references.

FIG. 1 schematically illustrates a control sequence of one embodiment of the drive system. After a manual starting of an internal combustion engine (which in the following figures bears the reference number 1) in step T0, the following step T1 asks whether a condition for stopping the engine 1 (so-called stop condition) is fulfilled. Specifically, the stop condition consists of a logical AND gate with the following defined conditions:

1. Engine speed n is less than 1300 rpm;
2. Vehicle's driving speed V is less than 4 km/h;
3. Coolant temperature T of the engine 1 is greater than 60° C.;
4. The vehicle has driven at least once faster than 4 km/h since the last (manual or automatic) start; and
5. The battery's charge is sufficient for additional starter activations (this condition is not shown in FIG. 1).

If the answer to this query is No, the control sequence again emerges between steps T0 and T1 above, so that the query in step T1 is repeated as a kind of quasi-endless loop until the stop condition occurs. If, on the other hand, the answer is Yes, the engine 1 is automatically stopped in step T2, e.g., by interrupting the fuel supply.

In the following step T3, the query is whether a condition for starting the engine 1 (so-called start condition) is fulfilled. The start condition can be, e.g., the condition "Driver has touched the gear shift lever?" If the answer to this query is No, the control sequence again emerges between steps T2 and T3 above, so that the query in step T3 is repeated as a kind of quasi-endless loop until the start condition is fulfilled. If, on the other hand, the answer to the query is Yes, the engine 1 is automatically restarted in step T4, namely, by an electric machine coupled directly to the drive shaft of the engine (which in the following figures bears the reference number 4). The engine 1 is also emergency-started when its temperature falls below the operating temperature or the battery charge falls below a certain limit value on account of current consumers being turned on. In order to prevent an unintentional starting of the vehicle in this case, however, fulfillment of the condition "No gear engaged" is required.

The control sequence then emerges between steps T0 and T1 above, so that the control sequence starts again from the beginning, i.e., it again queries whether the stop condition is present. In both of the above quasi-endless loops, furthermore, there is a query (not shown) as to whether to perform a manual stop (say, by turning an ignition key). If, in the particular loop, the answer is No, it is run through once again. If the answer is Yes, the control sequence ends.

Figure 2:
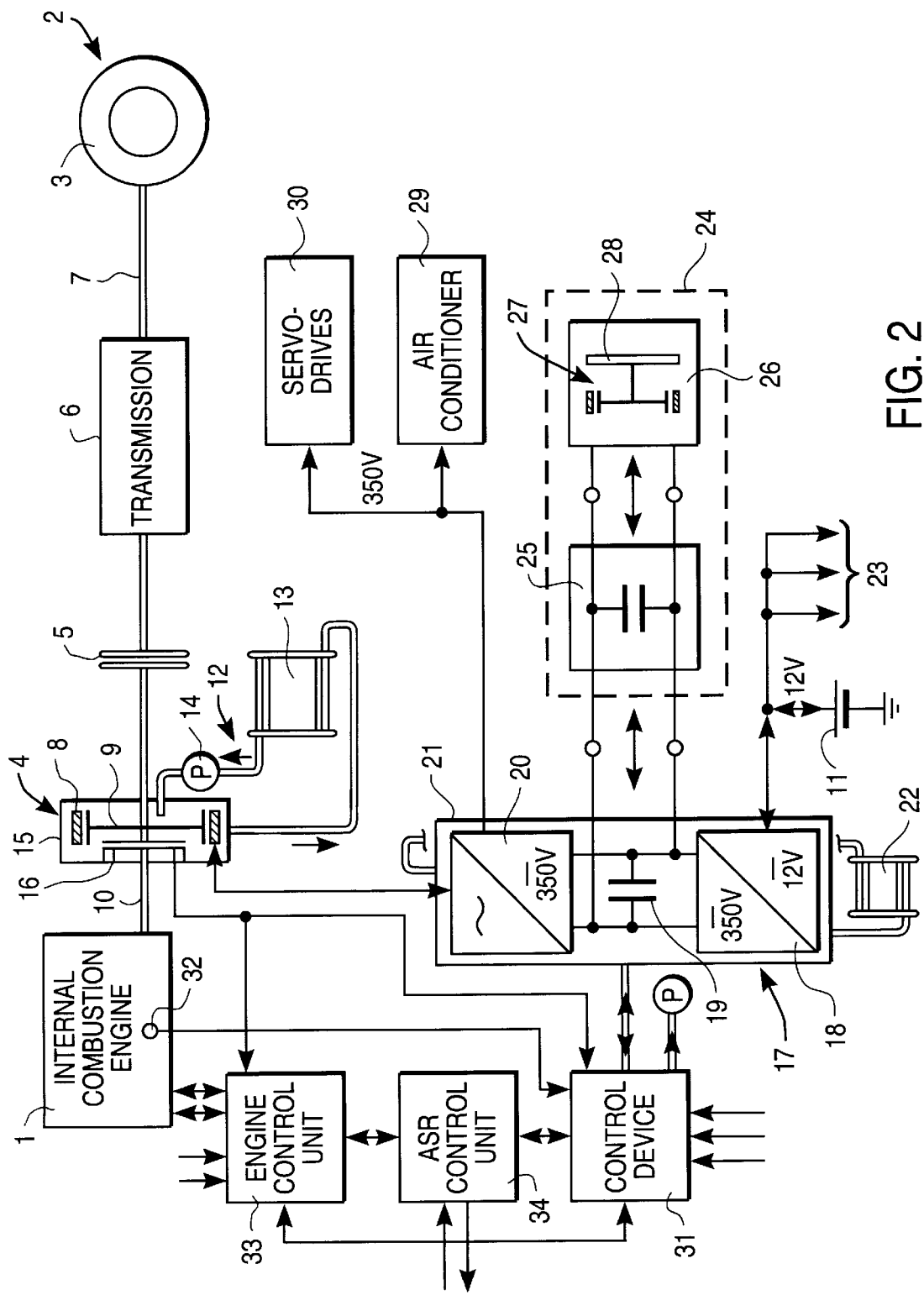
FIG. 2 a not-to-scale schematic representation of one embodiment of the drive system.

The drive system of a motor vehicle, such as a passenger car, represented in FIG. 2, has as its drive assembly an internal combustion engine 1, which can be a four-cylinder, four-stroke Otto or Diesel motor. The torque produced by the engine 1 can be transferred by a drive train 2 to drive wheels 3. In the takeoff direction, in the drive train 2, there first comes after the engine 1 an electric machine 4. This is followed by a travel coupling 5, a transmission 6, and an axle drive 7, which transfers the torque to the drive wheels 3. The coupling 5 and the transmission 6 can be a frictional clutch and a gearbox; alternatively, for example, an automatic coupling or transducer coupling are possible, each with gearbox or automatic transmission. In other embodiments (not shown), an additional coupling (activated by a control system) is arranged in the drive train 2 between engine 1 and electric machine 4, in order to prevent the engine 1 from following along when braking with the electric machine 4.

The electric machine 4—here, a rotary-current traveling-wave machine in induction or synchronous design—comprises a stator 8 and a rotor 9. The former is stationary and thrusts against the internal combustion engine 1, the vehicle chassis (not shown), or a coupling housing (not shown), whereas the latter sits directly on a drive shaft (crankshaft) 10 of the engine 1 or an extension thereof and is firmly coupled to it. The drive shaft 10 and the rotor 9 thus rotate together, without a gearing coming in between.

The electric machine 4 fulfills several functions: it functions on the one hand as a starter, as has already been explained in connection with FIG. 1. On the other hand, it functions as an active reducer of rotational nonuniformity, as shall be explained more closely by means of FIG. 3. Moreover, it acts as a generator to charge the vehicle's battery 11 and to supply electrical consumers and thereby replaces a dynamo normally present in the motor vehicle. Furthermore, the generator function can serve to brake the vehicle or the engine 1. In addition, the electric machine 4 can function as an additional motor ("booster"), e.g., to support the engine when accelerating the vehicle. Finally, by virtue of the moment of inertia of the rotor 9, it functions as a flywheel and can thus replace the flywheel generally present on the crankshaft in traditional motor vehicles for this purpose.

The electric machine 4 is cooled on the inside by a fluid cooling, here, a spray fluid cooling 12. After going through a cooler 13 and a pump 14, the cooling fluid—here, suitable oil—is sprayed onto the rotor 9, and this in proximity to its axis of rotation. Because of the rotation of the rotor and centrifugal force, it travels outwardly, thereby cooling rotor 9 and stator 8, and then exits a housing 15 of the electric machine 4, again returning to the cooler 13 in a closed circuit. Depending on the loss power and rotary speed, the flow of coolant is provided by corresponding control of the pump 14, so that each time only just the required minimum of cooling fluid is present inside the housing 15. An equalization vessel (not shown) allows this variation in the amount of coolant in the housing 15. In other configurations (not shown), the electric machine (or only the rotor) is integrated in a coupling and/or transmission housing and cooled by a lubricating and/or cooling fluid (e.g., clutch or transmission oil) located therein.

Furthermore, the electric machine 4 is outfitted with a rotation transformer 16 (so-called resolver), which preferably has more than eight poles, here, for example, 12 poles. It consists of two adjacent circuit boards, one of which is stationary and the other turns with the drive shaft 10. The circuit boards have windings formed by conductor tracks on their facing surfaces, such that a transformer translation ratio dependent on angle of rotation results. The rotation transformer 16 operates on the transponder principle: The stationary windings (stationary board) are actively loaded with current/voltage and give off electromagnetic energy to the rotating windings (rotating board). The latter radiates a portion of this energy back again, and this portion depends on the angle of rotation, given the angle-dependent transmission ratio. The back-radiated portion generates in the stationary windings a signal dependent on angle of rotation. Evaluation of this signal provides the instantaneous angle of rotation of the drive shaft 10 with a precision of at least 0.5 degrees. In more simple configurations, an incremental pickup is used, or there is no such pickup at all.

An inverter 17 provides the stator 8 of the electric machine 4, at a very high clock frequency (e.g., 10–100 kHz), with sine-reinforced pulse width modulated voltage pulses, which under the action of the machine's inductance basically yield sinusoidal three-phase currents, whose amplitude, frequency and phase are freely selectable.

The inverter 17 is a voltage intermediate-circuit pulse inverter and comprises three subassemblies: a dc voltage converter 18 (input assembly), which converts dc voltage from a low level (here, 12 V) to a higher intermediate circuit level (here, 60 V or 350 V) or back again, an electrical intermediate circuit accumulator 19, here, a capacitor or an arrangement of parallel-switched capacitors, and a machine inverter 21 (output assembly), which can generate from the intermediate circuit dc voltage the (synchronized) three-phase alternating voltage of variable amplitude, frequency and phase or—when the electric machine 4 is operating as a generator—can convert any such alternating voltages into the intermediate-circuit dc voltage. In other configurations (not shown), the intermediate circuit level lies at the upper edge of the low-voltage range that is permitted without special electrocution protection, here, 60 V.

The three subassemblies 18, 19, 20 of the inverter 17 are hermetically enclosed in a metal housing 21, which is filled with a suitable boiling type coolant. This is, for example, a fluorohydrocarbon, having a suitable boiling point, e.g., 60° C., at a suitable pressure (say, between 50 mbar and 3 bar). Evaporated coolant can condense in a condensation cooler 22 and return to the housing 21 in liquid form in a closed circuit. The housing 21 with the cooling circuit is hermetically tight.

The dc voltage converter 18 is connected, at the low-voltage side, with the vehicle's battery 11 and various low-voltage consumers 23, such as lighting and electronic devices. The inverter 17, on the one hand, can furnish current at low voltage level for charging the vehicle's battery 11 and supplying the low-voltage consumers 23, and on the other hand it can take current from the vehicle's battery 11 at low voltage level for starting the internal combustion engine 1. In other configurations (not shown), the vehicle's battery is at intermediate circuit level and coupled directly to the intermediate circuit.

The intermediate circuit accumulator 19 is connected to an external additional accumulator 24, which can be an electrical accumulator, here, an extra capacitance 25, and/or a flywheel accumulator 26. The additional accumulator 24 has the primary task of buffering the energy obtained from the rotational nonuniformity reducer in a brake phase and surrendering it again for the following drive phase. In addition, it can also serve to save that energy which accrues during other brake processes mediated by the electric machine 4. Finally, it can take strain off the vehicle's battery 11 when starting the engine 1, since it takes energy only slowly from the battery and saves it in the additional accumulator 24. Here, it is then available for fast removal during the starting process.

On the other hand, the (inner) intermediate circuit accumulator 19 has the basic task of providing voltage with the necessary steep rise time for clock purposes—i.e., quickly—to the machine-inverter group. It does not need any very high capacitance for this (e.g., it has 2·F), and in fact low lead inductances are more advantageous for speed purposes, which is ensured by the arrangement in the interior of the inverter 17 (and preferably on the same board on which the electronic switches of the machine-inverter 20 are also arranged). The additional accumulator 24, on the other hand, can work relatively slowly, so that the lead capacitances here are not a problem, due to the external arrangement. In particular, the additional capacitance 25 can be 50–10,000 times greater than that of the intermediate circuit accumulator 19 (here, it is 4.7 mF, for example, for furnishing the rotational nonuniformity energy).

Even larger storage capacities can be achieved with the flywheel accumulator 26, which here comprises its own inverter-controlled electric machine 27 and a gyrating mass 28 coupled to it. The latter can be formed by a separate flywheel or be integrated in the rotor of the electric machine 27. The moment of inertia of the gyrating mass 28 is preferably 0.05 to 2 kgm$^2$. It is also possible to store a multiple of the energy needed to start the engine 1 in the flywheel accumulator 26 and quickly remove the particular energy needed for starting from it (i.e., in less than 1 second).

In other configurations (not shown), no separate additional accumulator 24 is provided. Here, the intermediate circuit accumulator 19 is dimensioned and possibly arranged outside the inverter 17 so that it can take on the function of the additional accumulator 24.

The intermediate circuit with its high voltage level (here, 60 V or 350 V) supplies various high-power consumers, such as an air conditioner 29 and servo-drives 30 with electrical energy. Whereas such high-power consumers are traditionally operated by mechanical coupling from the internal combustion engine 1, the high-voltage level available here allows a more efficient, purely electrical powering.

A control device 31, through appropriate actuation of its semiconductor switches, instructs the inverter 17 at each moment of time as to the amplitude, frequency, and phase that the alternating voltage generated by it should have. The control device 31, which can be formed, for example, by a correspondingly programmed microcomputer system, first determines the magnitude and the direction of the torque which the electric machine 4 is supposed to produce at a particular time. It can do this, e.g., for the starting, on the basis of memorized values, which specify the nominal time curve of the rotary speed or torque of the electric machine 4 during the starting process, perhaps supplemented by a measurement of these quantities and a feedback control, which ensures that the preset values are maintained. For the active reduction of rotational nonuniformities, it can do this, e.g., by means of a characteristic diagram control system, in that it obtains, as input information from the rotation transformer 16, the angular position of the drive shaft 10, the mean rotary speed at the moment, and possibly other operating parameters, such as the throttle valve position, and it determines from a memorized characteristic diagram the rotational nonuniformity to be expected at the moment, as a function of these operating parameters. Another possibility is to determine the rotational nonuniformity actually existing at the time, for example, by computing the instantaneous rotational velocity on the basis of information furnished by the rotation transformer 16 and/or by evaluating the gas pressures existing in the engine 1 at the time, which can be detected by means of gas pressure sensors 32, and also by picking up the instantaneous torque of the engine 1 by means of a torque hub (not shown) in the drive train. A combination of closed-loop and open-loop control is also possible. From the value thus determined for the instantaneous rotational nonuniformity, a corresponding (opposite-phase) value is derived for the rapidly changing nominal torque of the electric machine 4, onto which may be additively superimposed a positive or negative constant torque of desired strength.

In a second step, the control device 31 determines which amplitude, frequency, and phase of the voltage or current must be provided by the inverter 17 in order for the electric machine 4 to produce this nominal overall torque. This determination is done, in electrical induction machines, on the basis of a field-oriented automatic control, which is based on a model computation for the electric machine 4 and which uses as input information essentially the measurable electrical quantities of the stator (amplitude, frequency and phase of current and voltage) and the instantaneous mean speed of the rotor.

In FIG. 2, the control device 31 is shown as being arranged outside the inverter housing 21. In order to keep the lead inductances low and also participate in the boiling bath cooling, however, it is arranged inside the inverter housing 21 in other configurations (not shown).

The control device 31 shares various sensors serving to carry out its control tasks and sensor information derived from them with a motor control unit 33 to control the engine 1. Specifically, these are, for example, the rotation transformer 16 (angle position pickup), the gas pressure sensors 32, as well as sensors (not shown) for detecting the mean rotary speed, the loading condition of the engine 1 (e.g., through the throttle valve position) and its torque (e.g., through a torque hub).

Figure 3A:
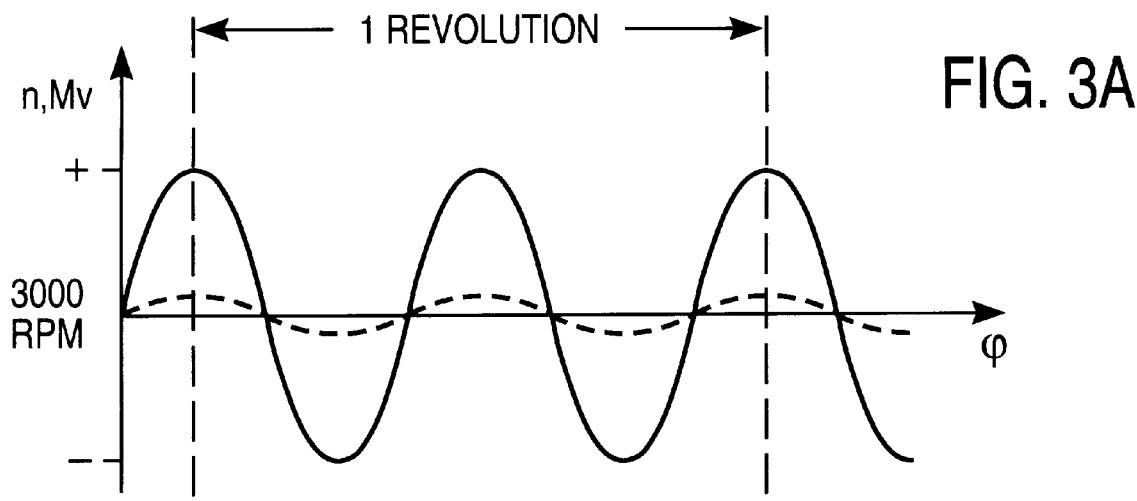
FIGS. 3A–3C a schematic sample representation of the functioning of an electric machine during active reduction of rotational nonuniformities.
Figure 3B:
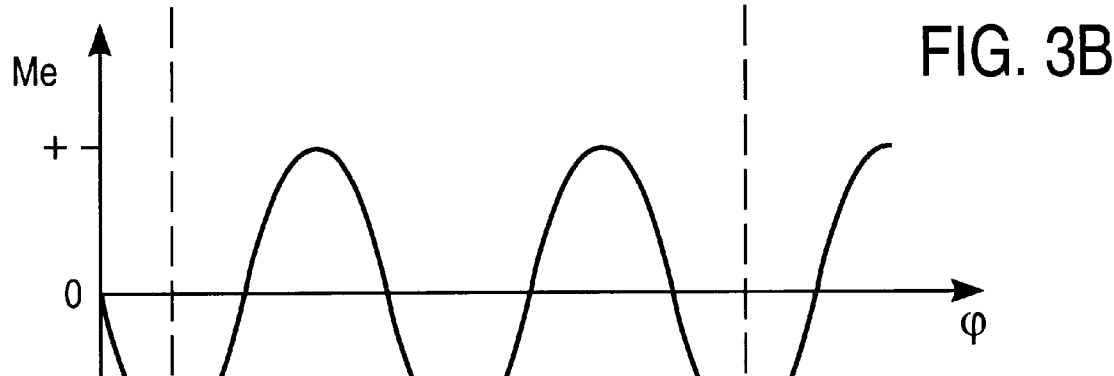
Figure 3C:
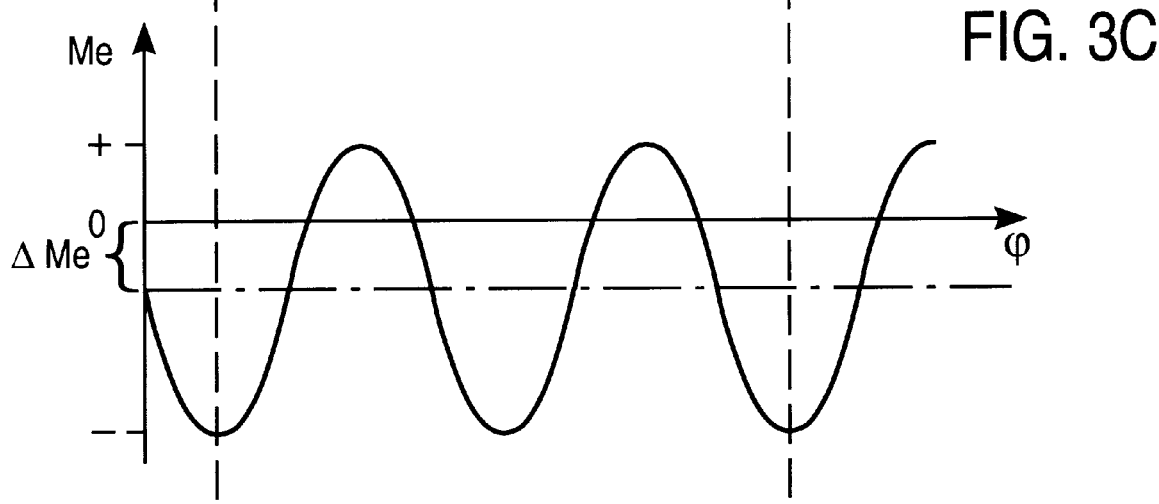

Furthermore, the control device 31 communicates with a number of other control units: an energy consumption control unit (not shown) indicates how much energy is needed for charging the vehicle battery 11, for supplying the low-voltage consumers 23 and the high-power consumers 29, 30, so that the control device 31 can provide for a corresponding overall torque adjustment·Me (see FIG. 3c). The motor control unit 33 implements the automatic start-stop control and tells the control device 31 whether the electric machine 4 should start the engine 1. While the engine 1 is running, it tells it whether to carry out the vibration diminishing function. Moreover, it tells it whether it is supposed to provide acceleration or braking of the vehicle, so that it can provide a corresponding overall torque shift·Me (see FIG. 3) and perhaps temporarily switch off the rotational nonuniformity reduction function. An ASR (drive slip control) control unit 34 tells the control device 31, when drive slip is present, that the electric machine 4 should temporarily act as a generator brake, if necessary before the ASR control unit institutes a braking of the particular drive wheels by the wheel brakes as a more massive remedy if the drive slip continues. In addition, the ASR control unit can relay its slip information to the motor control unit 33, to bring about a further reduction in the engine torque. In other configurations (not shown), the motor control unit 31 takes over the start-stop function.

The control of the start-stop automation and of the engine 1 occurs in dependence on different variable quantities: first, in dependence on user-controlled quantities, such as gas pedal position (and, thus, throttle valve position), preselected driving speed, selected transmission gear, brake and clutch activation and driving characteristics in the previous driving history (e.g., sporty driving characteristic); second, operating quantities, such as rotary speed, crankshaft angle, torque, gas pressure, knocking, drive slip, coolant temperature, exhaust gas composition, exhaust gas composition [!], driving speed. All of these control chores can be taken on by the very high-performance control device 31 for the electric machine 4.

In other configurations (not shown), a motor control unit (like 33 in FIG. 2)—derived from a conventional motor management system—takes on the control of the electric machine 4. Thus, the control device 31 can then be dispensed with.

Energy obtained during each type of braking is kept in the additional accumulator 24, to be re-used for subsequent powering of the electric machine 4 or diverted to the vehicle battery 11.

FIG. 3a shows the active reduction of rotational nonuniformity. The solid line shows the rotary speed n of the drive shaft 10 as a function of the crankshaft angle φ. The shaft periodically executes speed fluctuations toward smaller and larger speeds about a mean speed (here, 3000 revolutions per minute), which in this idealized example have a basically sinusoidal appearance. The drive shaft 10 is, for example, the crankshaft of a four-cylinder, four-stroke internal combustion engine of a motor vehicle, having in the second order (i.e., at a frequency of 100 Hz) a relatively large rotational nonuniformity resulting from the gas and mass forces. As an illustration, the angle interval needed for one revolution of the shaft is also indicated. In general, rotational nonuniformities of higher orders and those of stochastic nature also occur on a shaft (not shown here). Thus, their appearance is generally not sinusoidal.

There are fluctuations in the torque Mv of the engine about a mean torque, basically proportional to the rotational nonuniformities. The solid line in FIG. 3a thus also illustrates the curve of the engine torque Mv as a function of the crankshaft angle φ.

FIG. 3b shows the total torque Me as a function of the shaft angle φ, which is applied by an electric machine coupled to the shaft. The curve of the machine torque Me largely corresponds to that of the rotational nonuniformity and the engine torque Mv, but is opposite in direction. That is, when there is a rotational nonuniformity toward higher speed (so-called positive nonuniformity), the electric machine generates a torque to brake the shaft (so-called negative torque), whereas in the case of a rotational nonuniformity toward lower speed (so-called negative nonuniformity) it generates a driving torque (so-called positive torque). The magnitude of the torque Me is chosen such that the rotational nonuniformity—and the fluctuation of the torque Mv proportional to it—is substantially reduced or even virtually disappears through its action, as is illustrated in FIG. 3a by the broken line.

In the mode of operation shown in FIG. 3b, the negative and positive torque extrema are equal in magnitude. Thus, the energy obtained during a braking phase is essentially equal to the energy used up in the following drive phase. Therefore, the outward energy flux is zero, and brake energy is only buffered temporarily inside the system. Thus, the system in this operating mode works like a pure rotational nonuniformity reducer with rapidly varying torque, without generating a constant torque.

An example of an operating mode of the system modified from the preceding one, with a constant torque, is shown in FIG. 3c: The time course of the total torque Me corresponds to that of FIG. 1, but it is shifted overall by a particular amount·Me (the so-called deviation) in the negative direction. The deviation·Me will generally vary slowly, but in the brief time frame represented here of approximately one period of rotation it is constant to a good approximation. The deviation·Me here is smaller than the amplitude of the rapid variation of the torque, so that the overall torque Me alternately takes on positive and negative values. Averaged over the rapid torque variation, one obtains a constant torque—·Me. Thus, on average, mechanical energy is withdrawn from the internal combustion engine, being largely transformed into electrical energy and taken out of the system. The electrical machine in this type of operation thus has the function of an electrical generator, besides the function of a rotational nonuniformity reducer, which can act as a brake and deliver current, e.g., to counterbalance operating losses of the system, to charge the vehicle's battery, and/or to operate electrical consumers.

If the deviation·Me is greater than the amplitude for reducing the rotational nonuniformity, the electric machine will only work as a brake and no longer as a drive, and the braking action will vary in magnitude according to FIGS. 3b and 3c, in opposite phase to the rotational nonuniformity.

Both small and very large generator powers can be adjusted simply by an appropriate adjustment of the (software) control system of the electric machine 4—without any structural (hardware) changes. Only the size of the electric machine 4 is a limitation. Thus, the very same machine type can be used, for example, for small and large vehicle types without design adaptation.

The overall torque curve can also be shifted in the positive direction (positive deviation). The electric machine 4 then works as a (driving) motor, besides its function as a rotational nonuniformity reducer, to support the engine when accelerating the vehicle, for example. During the starter function the rotational nonuniformity reduction is generally inactivated, and only a positive constant torque is produced.

Figure 4:
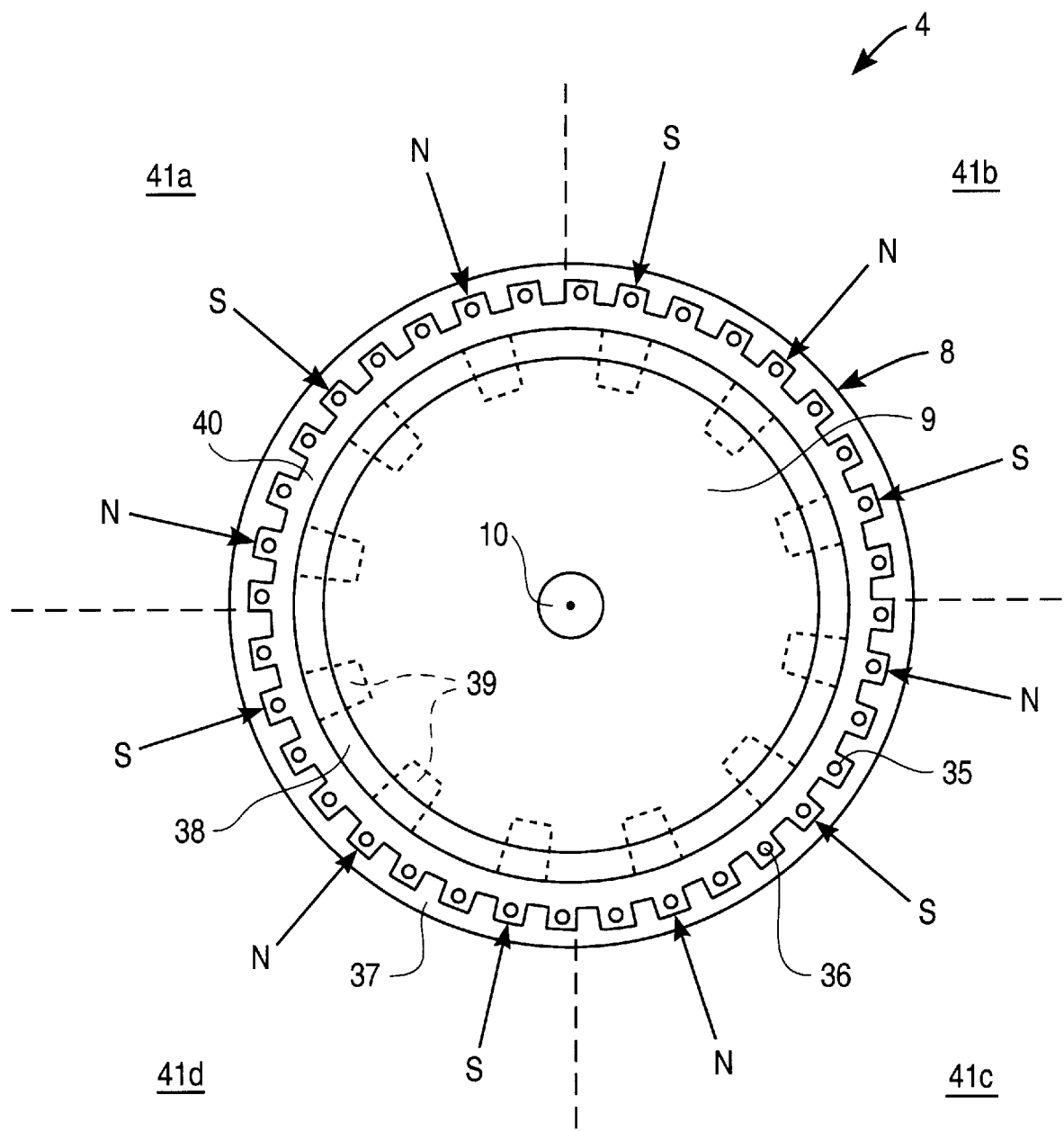
FIG. 4 a schematic cross sectional representation of an electric machine with plane of sectioning perpendicular to the axial direction in order to illustrate various machine types which can be used in the system.

The electric machine 4, shown more closely in FIG. 4, has no brushes or wiper and is thus free of wear. It has an outer diameter of around 250 mm and a length in axial direction of 55 mm and produces a continuous torque of around 50 Nm and a peak torque of around 150 Nm with a weight of 10–15 kg. It can attain rotary speeds corresponding to the peak speed of conventional internal combustion engines (around 6000 to 10,000 rpm) and is speed-resistant up to 14,000 rpm. The electric machine 4 has an exterior stator 8, having grooves 35 in the direction of the drive shaft 10 (axial direction). The stator 8 carries a three-phase winding 36, configured such as to form 12 poles when energized with three-phase current. There are three grooves 35 per pole, and thus a total of thirty-six grooves 35. (In other configurations (not shown), at least six grooves per pole, preferably nine grooves, are present in order to reduce stray effects.) The poles revolve in circular motion in the stator 8 with the rotary-current oscillation. Their momentary position at a particular time is shown by arrows carrying the designations "S" (for south pole) and "N" (for north pole). A back 37 closing off the grooves 35 on the outside is relatively thin in radial direction, its thickness being preferably 3–25 mm (at the location of a groove 35). The stator 8 is constructed from thin plates (the thickness here is 0.25 mm) of a material with low remagnetization losses (here, less than 1 W/kg at 50 Hz and one Tesla), with the planes of the plates being perpendicular to the axial direction.

The interior rotor 9 in the case of the induction machine is fashioned as a squirrel-cage rotor with cage bars traveling essentially in the axial direction, each of them being joined at the end face to a short-circuit ring 38. In the case of the synchronous machine, the rotor 9 carries a corresponding number of poles to the stator 8 (here, 12 poles), which can be formed by permanent magnets or appropriately excited coils. FIG. 4 also shows the synchronous machine, schematically indicating its rotor poles (reference number 39).

The air gap 40 between rotor 9 and stator 8 is relatively large; its width is 0.25 to 2.5 mm, preferably 0.5 to 1.5 mm.

In other configurations (not shown), the rotor is exterior and the stator is interior.

Figure 5:
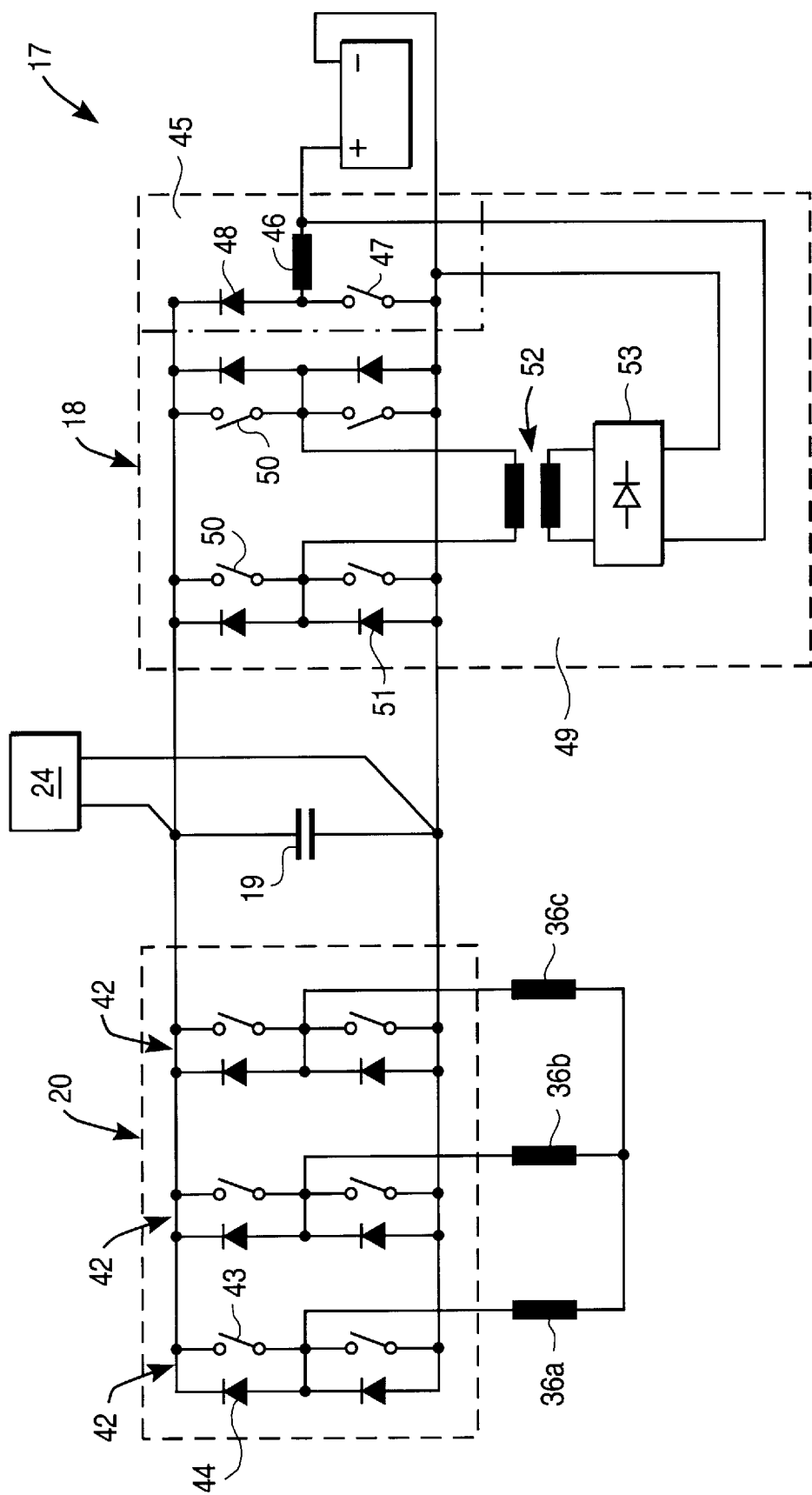
FIG. 5 a schematic circuit diagram of an inverter used in the system.

FIG. 5 shows a schematic diagram of the inverter 17. One recognizes the intermediate circuit accumulator 19 in the form of a capacitor, which is switched in parallel to the additional accumulator 24 (not shown more closely here). The capacitor symbolizes a parallel connection of several capacitors.

The machine inverter 20 is formed by three parallel-connected (but independently engaging) switch groups 42, each of the switch groups 42 being responsible for generating one of the three 3-phase voltages. Each of the switch groups 42 is a series connection of two (independently switching) switches 43 between the plus and the minus pole of the intermediate circuit. The series connection is joined at the center (i.e., between the switches 43) by one side to one of the three windings 36a, 36b, 36c of the three-phase winding 36; at the other side, the three windings 36a, 36b, 36c are joined together.

A free-wheeling diode 44 is connected in parallel to each of the switches 43. It is polarized such that it normally blocks and only when the opposite switch is open does it let through a brief current flow in the other direction, generated by self-inductance.

Each switch 43 symbolizes a parallel connection of several (e.g., five) MOS field-effect transistors, which are directly actuated by the control device 31 to form a three-phase current of desired amplitude, frequency and phase.

The dc voltage converter 18 comprises two subassemblies, namely, one which can bring electrical energy from the low voltage level (12 V) up to the high intermediate-circuit voltage level (60 V or 350 V), and another which can bring electrical energy from the high voltage level (60 V or 350 V) to the low voltage level (12 V). The first-mentioned subassembly can be absent from configurations with vehicle battery arranged in the intermediate circuit.

The first subassembly is, for example, a step-up transformer 45. This is formed by a series circuit of an inductance 46, connected to the plus pole of the vehicle's battery 11, and a switch 47 connected to its minus pole and the minus pole of the intermediate circuit, this series circuit being connected in the middle to the plus pole of the intermediate circuit via a step-up diode 48 (polarized in the conducting direction). When the switch 47 is closed, a circular current flows from the plus to the minus pole of the vehicle battery 11. After opening the switch 47, a self-inductance voltage tries to prevent a collapse of this current, with the result that the high intermediate-circuit voltage level (60 V or 350 V) is temporarily exceeded and current flows through the (otherwise blocking) step-up diode 48 and charges the intermediate-circuit accumulator 19. By periodically opening and closing the switch 47, one achieves a quasistationary charging current, e.g., in preparation of the starting process. The switch 47 is a semiconductor switch, which is directly actuated by the control device 31.

The second subassembly is a step-down voltage transformer 49, for example, which functions similar to a switching power pack. It comprises two series circuits of switches 50 between the plus and minus pole of the intermediate circuit, each of them with parallel-connected free-wheeling diodes 51. The ends of a primary winding of a high-frequency (HF) transformer 52 are each connected to the middles of these series circuits. The secondary winding of the HF transformer 52 energizes a rectifying and smoothing unit 53, which in turn energizes the vehicle battery 11 and possibly low-voltage consumers 23. The switches 50 symbolize semiconductor switches, which are directly actuated by the control device 31. By periodically opening and closing the switches, a high-frequency alternating current can be generated, which induces in the secondary winding of the HF transformer 52 a corresponding alternating voltage at lower voltage level, which is rectified and smoothed out by the unit 53. The exact value of the resulting dc voltage can be precisely adjusted by means of the switch 50, through varying the switching frequency.

Figure 6:
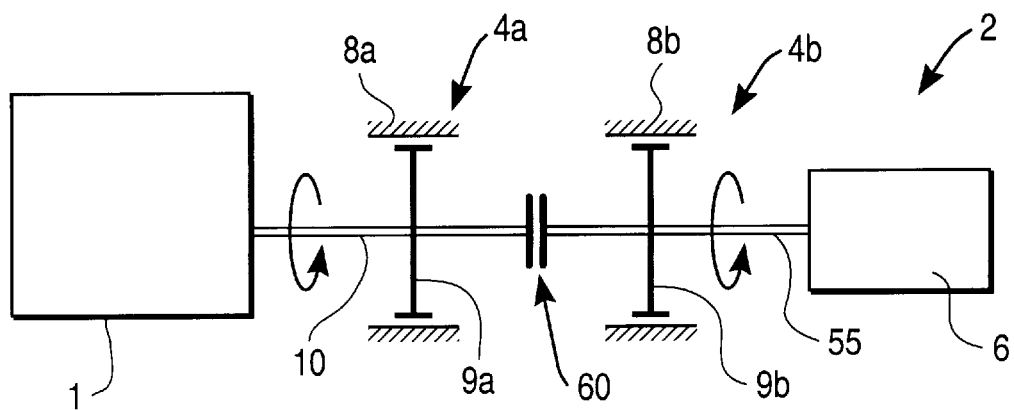
FIG. 6 a schematic representation of a dual electric machine.

A dual electric machine 4, per FIG. 6, which can also provide the function of an electromagnetic coupling and/or a synchronizing device for a following transmission, sits in the drive train 2 between the drive shaft, e.g., the drive shaft 10 of the internal combustion engine 1, and the takeoff shaft, e.g., the transmission shaft 55 coupled to a transmission 6. It comprises two electric machines 4a, 4b, each with a nonrotating stator 8a, 8b and each with a rotor 9a, 9b, rotating with the drive shaft and takeoff shaft, respectively. The rotors 9a, 9b—and, thus, the drive shaft and takeoff shaft—can be firmly mechanically joined together—by means of a mechanical bridge coupling 60—here, a positive-locking or friction-locking coupling. Preferably, this can be actuated in controlled manner, e.g., mechanically, electrically, magnetically, electromagnetically, hydraulically or pneumatically. In other embodiments, the bridge coupling 60 is not present.

Figure 7:
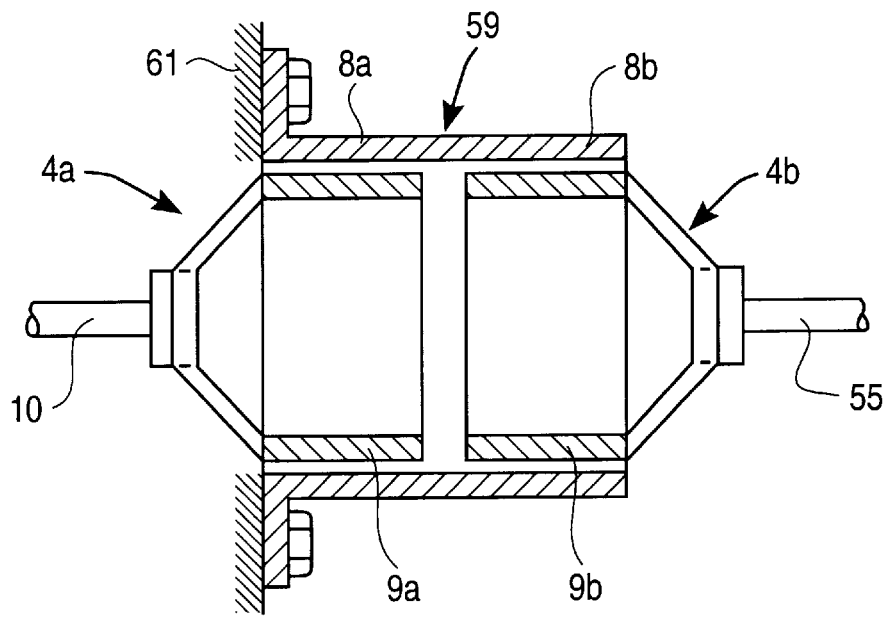
FIG. 7 a representation of a dual machine per FIG. 6 with joint stator body.

FIG. 7 shows a dual machine 4 corresponding to FIG. 6, in which the rotors 9a, 9b are arranged in a common stator body 59 in coaxial manner, which accommodates the two (electrically separated or separable) stators 8a, 8b and is firmly secured, e.g., to a crankcase 61 of the engine 1. The bridge coupling (not shown here) can be implemented, for example, in that the rotors 9a, 9b can be brought into positive or friction locking with each other by axial shifting. As an alternative, it can be formed, e.g., by a friction or claw coupling, integrated in the rotors 9a, 9b.

In the dual machine 4 of FIGS. 6 and 7, the direct starting of the engine 1 occurs in that the machine 4a at the drive end is operated as a motor.

Figure 8:
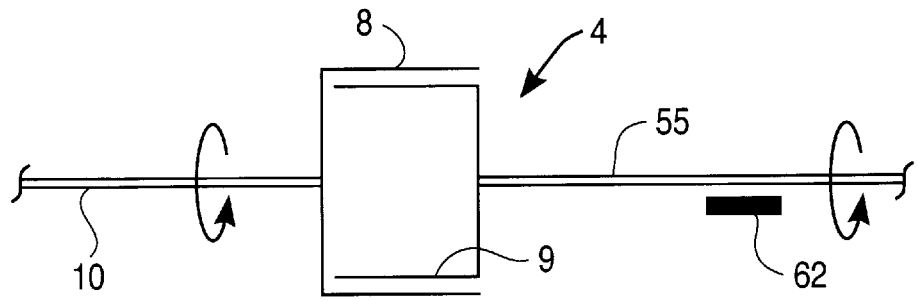
FIG. 8 a schematic representation of an electric machine with electromagnetic operating units that can rotate.

A single electric machine 4 per FIG. 8, which has the function of an electromagnetic coupling and/or synchronizing device, has an inner and an outer electromagnetic active element, which are termed here the rotor 9 and the stator 8', borrowing the conventional terminology from electrical machines. The rotor 9 is firmly joined to the takeoff shaft 55 and the stator 8' is firmly joined to the drive shaft 10 (in other configurations—not shown—this arrangement is reversed).

The electric machine 4 can thus rotate as a whole in addition to the rotor's rotation; the term "stator" should thus be taken only in a transferred sense, seeing that it can rotate. Whereas in a stationary electrical machine—such as a rotary-field machine—it is possible to restrict the current supply to the stationary active element (i.e., the stator) and to produce currents in the rotating active element (i.e., the rotor) without supplying current, by induction alone, in the present case—where both active elements can rotate—current is supplied to at least one of them (here, the stator 8') across rotation-movable electrical connections (e.g., across wiper/slip ring contacts, not shown here). The takeoff shaft 55 can be prevented from turning with a mechanical clutch, here, a brake 62 which is thrust against the vehicle chassis or the transmission housing. The configuration shown has no bridge coupling, but other configurations (not shown) are outfitted with a frictional or nonpositive-locking bridge coupling for the mechanical connection of the shafts 10, 55. The machine 4 can be placed in or on the engine housing, transmission housing, or at any other place in the drive train 2.

The electric machine 4 can start the internal combustion engine 1 directly, by thrusting against the takeoff shaft 55 fixed by the brake 62.

The single electric machine 4—like the dual machine of FIGS. 6 and 7, of course—can perform various auxiliary functions.

In the function as shift coupling and possibly as starting coupling, a synchronism of the shafts 10, 55 is achieved by such an adjustment of the torque-generating magnetic fields of the machine 4 that a uniform rotary speed prevails between the shafts 10, 55, i.e., the coupling slip between stator 8' and rotor 9 precisely vanishes. In an induction machine, this is accomplished, for example, by closed-loop control or open-loop control of the magnetic slip of a rotary field of suitable frequency and amplitude, turning opposite the direction of the drive torque. A positive-locking bridge coupling (not shown here) eliminates the electromagnetic losses during vanishing coupling slip.

The active transmission synchronization serves to accelerate or brake the drive shaft 55 during a gear shift such that the gears being meshed together have the same peripheral velocities. This function can be implemented in configurations of the single machine 4 even without coupling function. The acceleration or braking of the shaft is accomplished by thrusting against the drive shaft 10 turning at the variable speed of the internal combustion engine 1. The contribution of this rotation is taken into account when determining and controlling the relative speed of the machine 4 necessary to the particular synchronization.

A reduction of rotational nonuniformities of the drive shaft 10 can occur with the vehicle at standstill, thrusting against the rotor 9 which is then prevented from turning by means of the brake 62. When moving under power, rotational nonuniformities of the takeoff shaft 55 can be reduced by rapid variation of the transmitted torque with the bridge coupling not engaged (or not present), specifically, by reducing [this torque] (i.e., increasing the clutch slip) for positive rotational nonuniformity and increasing [this torque] (i.e., decreasing the clutch slip) for negative nonuniformity.

Additional acceleration or braking is possible with the bridge clutch not engaged by generating appropriate torques—or in other words—less or more clutch slip. The electric machine 4 can be involved in an ASR control such that, if the drive wheel slip is too great, the clutch slip is momentarily increased and, thus, the torque applied to the drive wheels is reduced. A generator function to produce current is achieved by permanently maintaining clutch slip.

Figure 9:
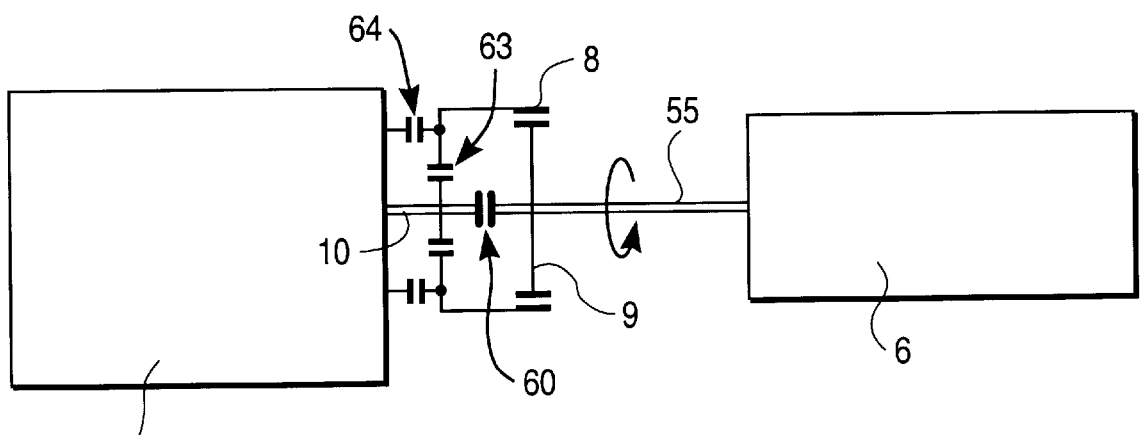
FIG. 9 a schematic representation of another electric machine with electromagnetic operating units that can rotate.

FIG. 9 shows a further modification of the electric machine with rotating active units per FIG. 8. Here, the stator 8' is not permanently coupled to the drive shaft 10, but rather can adopt three different coupling states in controllable manner:

1. coupled to the drive shaft 10 (as in FIG. 11);
2. freely rotatable without coupling to the drive shaft 10;
3. secured against rotation.

Two additional mechanical couplings, which can be friction-locking, but preferably also positive-locking couplings, are used for this: an engine coupling 63, which in the closed state couples the stator 8' to the drive shaft 10 (coupling condition 1), and a stop coupling 64, which in the closed state stops it from turning, e.g., by coupling to the crankcase 61 (coupling condition 3). For coupling condition 2, both of them are opened; a simultaneous closing is a forbidden state. The couplings 63, 64 (which are drawn double in FIG. 4 only for reasons of rotational symmetry), as well as the bridge coupling 60, can be activated in controlled manner, e.g., mechanically, electrically, hydraulically or pneumatically.

The direct starting occurs in coupling condition 3. Specifically, the control of the electric machine 4 and the couplings 60, 62, 63 occurs through the different operating states and functions of the drive system according to the following process sequences:

I. Direct starting of the internal combustion engine 1:
 1. Release gear (e.g., by the driver);
 2. Stop coupling 64 and bridge coupling 60 are closed;
 3. Rotor 9 is accelerated from standstill to idling speed by electric machine 4 running along with engine 1;

II. Starting of the vehicle:
 1. Bridge coupling 60 is opened;
 2. Rotor 9 is brought to a halt by electric machine 4;
 3. First gear engaged (e.g., by driver);
 4. Stop coupling 64 is opened, so that the stator 8' turns freely;
 5. Stator 8' is brought up to engine speed by electric machine 4;
 6. Engine coupling 63 is closed;
 8. Rotor 9 is electromagnetically accelerated with nominal starting torque, i.e., carried along by stator 8';
 9. When synchronized, bridge coupling 60 is closed;

III. Stationary driving operation with reduction of rotational nonuniformity:
 1. Engine coupling 63 is opened, so that the stator 8' turns freely;
 2. Stator 8' is brought to a halt by electric machine 4;
 3. Stop coupling 64 is closed, so that a rigid connection prevails between stator 8' and the crankcase of the engine 1;
 4. Alternating torque is generated by the electric machine 4 to reduce rotational nonuniformities of the drive shaft 10;

IV. Shifting:
 1. Engine drive torque is removed (if necessary, with support from the electric machine) (e.g., by driver);
 2. Bridge coupling 60 is opened;
 3. Gear is disengaged (e.g., by driver);
 4. Rotor 9 is accelerated or braked to that new speed which fulfills the synchronization condition for the new gear to be engaged;
 5. This gear is engaged (e.g., by the driver);

6. Bridge coupling 60 is closed;

7. Engine drive torque is again applied (e.g., by driver).

After the starting in step I, a reduction of rotational nonuniformity is also possible in idling.

The closing of the couplings 60, 63, 64 occurs only at vanishing relative speed each time. The generator function and additional braking or driving constant torques are implemented—like the synchronization function and the reduction of rotational nonuniformity—with closed bridge coupling 60 and closed stop coupling 64 by appropriate braking or driving torques of the electric machine 4.

Figure 10:
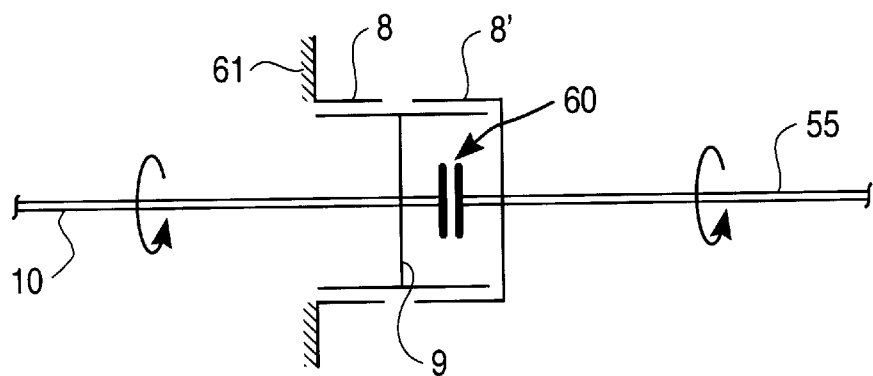
FIG. 10 a schematic representation of another electric machine with electromagnetic operating units that can turn relatively and a stationary operating unit.

The electric machine 4 per FIG. 10 largely corresponds functionally to that shown in FIG. 9, so that the remarks on FIG. 9 are also valid here—except as regards the departures mentioned hereafter. A major difference from the machine of FIG. 9 consists in that the switching from "rotating rotor" to "stationary rotor" does not occur mechanically, by opening and closing of couplings, but rather electrically. A further difference consists in that the roles of the drive shaft 10 and the takeoff shaft 55 of the machine 4 shown are reversed as compared to FIG. 10, which leads to minor departures in the mode of functioning—explained more closely below. In embodiments (not shown), however, the roles of the drive shaft 10 and the takeoff shaft 55 correspond to those of FIG. 10; these embodiments do not show these departures.

In the electric machine 4 shown, the (exterior) stator 8' and the (interior) rotor 9—as mentioned—are firmly joined to the takeoff shaft 55 and the drive shaft 10, respectively, and cannot be decoupled. In addition to the rotary stator 8', the machine 4 is outfitted with a stator 8 prevented from turning, which thrusts against the crankcase 61 (for example). This is immediately adjacent to the rotary stator 8', being displaced in the axial direction (for example) toward the engine 1. It is arranged coaxially to the rotary stator 8' and has the same internal diameter. The windings of the two stators 8', 8 are self-standing, so that they are decoupled or can be decoupled in their generation of magnetic field. The rotor 9 is broad enough that it extends in axial direction over substantially the active surfaces of both stators 8', 8. A bridge coupling 60—as in FIG. 10—couples the drive shaft 10 to the takeoff shaft 50. In other embodiments (not shown), the rotor 9 is on the outside and the stators 8', 8 on the inside.

The shifting between the stationary stator 8 and the rotary stator 8' occurs by means of a switchable power supply unit, here, a suitably switchable inverter. This supplies either the stationary stator 8 for the functions of direct starting, reduction of rotational nonuniformity, vehicle braking and acceleration, and the generator functions, or the rotary stator 8' for the functions of electromagnetic coupling or synchronization, with the respective currents and voltages required each time, being able to switch inertia-free and without noticeable time delay between them.

Unlike FIG. 9, the function "synchronization" is controlled by generating torque between the rotary stator 8' and the rotor 9, which requires more control engineering because of the thrusting against the variable-speed drive shaft 10. This is because, in the machine 4 of FIG. 10, the bridge coupling 60 viewing in the takeoff direction lies behind the electric machine formed from the stationary stator 8 and the rotor 9, whereas in the machine 4 of FIG. 9, it lies in front of the electric machine with stationary stator. In the embodiment (not shown) in which the roles of the drive shaft 10 and the takeoff shaft 55 are reversed compared to FIG. 10, this functional difference from FIG. 10 does not exist.

In other embodiments, the two stators 8, 8' are simultaneously and independently fed by two independent power supply devices, here, inverters 17. This enables an execution of the functions assigned to the stationary stator 8, e.g., the generator function and the reduction of rotational nonuniformity, even during the execution of the functions assigned to the rotating stator 8', e.g., the electromagnetic coupling function.

What is claimed is:

1. A drive system, in particular for a motor vehicle, comprising:

a drive system in the form of a combustion engine (1);

an electrical machine (4) that is or can be coupled with a drive shaft (10) of the drive system which rotates with the same number of revolutions as the drive shaft (10) and arranged in such a way that by running together, the drive system can be started from the idle state;

at least one inverter (17) which produces the voltages and/or currents with variable frequency, amplitude and/or phase required for the magnetic fields of the electrical machine (4);

wherein the inverter (17) has an intermediate circuit on a voltage level higher than that of the on-board electrical system, and in said on-board electrical system, a power storage device (11) is provided for storage of electric energy;

and wherein on the higher voltage level of the intermediate circuit, another power storage device (19,24) is provided for storage of electric energy, and with an automatic start-stop control system within the scope of which the drive system is controlled by the electrical machine (4).

2. A drive system according to claim 1 wherein the rotor (9) of the electrical machine (4) is located on the drive shaft (10) or an extension thereof.

3. A drive system according to claim 1 wherein the start-stop control system automatically stops the drive system in the presence of a stopping condition, such stopping condition in particular being based on one or more of the following individual conditions: zero load, overrun, drive system idling, motor vehicle idle, drive system uncoupled, no gear selected, service or manual braking system activated, actuation of a stop switch.

4. A drive system according to claim 1 wherein the start-stop control system automatically starts the drive system with the help of the electrical machine (4) in the presence of a starting condition, such starting condition in particular being based on one or more of the following individual conditions: actuation of the accelerator pedal, deactivation of the service or manual brake, actuation of the clutch, touching or moving a stick shift, selection of a gear, actuation of a starting switch.

5. A drive system according to claim 1 wherein the electrical machine (4) has a driving effect at least essentially until the idling rpm of the drive system is reached.

6. A drive system according to claim 1 wherein the electrical machine acts as an electrical brake in the case of drive system stop in overrun.

7. A drive system according to claim 1 wherein the electrical machine (4) furthermore has the function of actively reducing rotational fluctuations.

8. A drive according to claim 7 wherein the electrical machine (4) is controlled in such a way as to produce a rapidly alternating torque, i.e. by decelerating in the case of positive rotational fluctuation and by accelerating in the case of a negative rotational fluctuation and/or produces a positive or negative, respectively, constant torque to achieve an accelerating or decelerating or rheostatic braking effect.

9. A drive system according to claim 7 wherein the energy gained upon reduction of a positive rotational fluctuation, i.e. braking energy due to rotational fluctuation, and/or any energy gained in the case of a decelerating additional torque, i.e. braking energy due to additional torque, is at least partially stored and at least partially reused, if necessary, in the reduction of a negative rotational fluctuation.

10. A drive system according to claim 1 wherein the electrical machine (4) has the additional function of a power supply generator.

11. A drive system according to claim 1 wherein the electrical machine (4) can trigger or support acceleration and/or deceleration of the drive shaft (10), in particular to accelerate or decelerate, respectively, a motor vehicle and/or reduce the slip f a drive wheel by deceleration.

12. A drive system according to claim 1 wherein the electrical machine (4) has a torque density, compared with the maximum torque, in excess of 0.01 NM/cm$^3$.

13. A drive system according to claim 1 wherein the inverter (17) has electronic switches (43, 47, 50) that are fluid-cooled, in particular boiling bath-cooled[1].

14. A drive system according to claim 1 wherein the electrical machine (4) acts as an electromagnetic clutch in the drive train (2) and/or as an active transmission synchronization device or as part thereof.

* * * * *